United States Patent
Uhm et al.

(10) Patent No.: US 11,996,067 B2
(45) Date of Patent: May 28, 2024

(54) METHOD AND APPARATUS FOR DISPLAYING VIRTUAL OBJECTS IN DIFFERENT BRIGHTNESSES

(71) Applicant: Samsung Electronics Co., Ltd., Suwon-si (KR)

(72) Inventors: Junwhon Uhm, Suwon-si (KR); Yunguk Lee, Suwon-si (KR); Seungnyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/066,663

(22) Filed: Dec. 15, 2022

(65) Prior Publication Data
US 2023/0120187 A1    Apr. 20, 2023

Related U.S. Application Data

(63) Continuation of application No. PCT/KR2021/005752, filed on May 7, 2021.

(30) Foreign Application Priority Data

Jul. 13, 2020   (KR) .................. 10-2020-0086326

(51) Int. Cl.
*G09G 5/10*   (2006.01)
*G02B 27/01*  (2006.01)

(52) U.S. Cl.
CPC .......... *G09G 5/10* (2013.01); *G02B 27/0172* (2013.01); *G09G 2320/0233* (2013.01); *G09G 2360/16* (2013.01)

(58) Field of Classification Search
CPC ............ G09G 5/10; G09G 2320/0233; G09G 2360/16; G09G 2320/0646;
(Continued)

(56) References Cited

U.S. PATENT DOCUMENTS

| 2011/0249886 A1 | 10/2011 | Park et al. |
| 2012/0092369 A1 | 4/2012 | Kim et al. |

(Continued)

FOREIGN PATENT DOCUMENTS

| CN | 109862339 A | 6/2019 |
| JP | 2017-182340 A2 | 10/2017 |

(Continued)

OTHER PUBLICATIONS

European Search Report dated Nov. 17, 2023, issued in European Patent Application No. 21841985.1.

*Primary Examiner* — Sahlu Okebato
(74) *Attorney, Agent, or Firm* — Jefferson IP Law, LLP

(57) ABSTRACT

A method and an apparatus for differently displaying brightness of virtual objects are provided. The apparatus includes an illuminance sensor, a camera module, a display module, a memory, and a processor operatively connected to the illuminance sensor, the camera module, the display module, and the memory, wherein the processor is configured to measure illuminance through the illuminance sensor, set the brightness of a first virtual object on the basis of the measured illuminance, identify the distance between the first virtual object and a second virtual object, set the brightness of the second virtual object on the basis of the brightness of the first virtual object and the identified distance, and control the display of the first virtual object and the second virtual object through the display module on the basis of the set brightness.

14 Claims, 12 Drawing Sheets

(58) Field of Classification Search
CPC ... G02B 27/0172; G06T 15/50; G06T 19/006; G06T 5/008; G06T 7/50; G06T 7/70; G06T 19/003; G06T 2207/10028; G06F 1/3212

See application file for complete search history.

(56) References Cited

U.S. PATENT DOCUMENTS

| | | |
|---|---|---|
| 2014/0132484 A1 | 5/2014 | Pandey et al. |
| 2014/0184759 A1 | 7/2014 | Lee |
| 2015/0061974 A1* | 3/2015 | Kobayashi ............... G06F 3/011 345/8 |
| 2018/0053284 A1 | 2/2018 | Rodriguez et al. |
| 2018/0176483 A1 | 6/2018 | Knorr et al. |
| 2018/0275410 A1* | 9/2018 | Yeoh ........................ G06T 15/00 |
| 2019/0011703 A1* | 1/2019 | Robaina ................. G06T 19/006 |
| 2019/0064528 A1* | 2/2019 | Fukazawa .......... G02B 27/0176 |
| 2019/0065027 A1 | 2/2019 | Hauenstein et al. |
| 2019/0244416 A1 | 8/2019 | Tamaoki et al. |
| 2020/0027201 A1 | 1/2020 | Chen |
| 2020/0252602 A1* | 8/2020 | Oonishi ............... G02B 27/017 |
| 2021/0027523 A1 | 1/2021 | Ichikawa et al. |
| 2022/0036779 A1 | 2/2022 | Nishibe et al. |

FOREIGN PATENT DOCUMENTS

| | | |
|---|---|---|
| JP | 2019-179542 A | 10/2019 |
| JP | WO2020/071029 A1 | 4/2020 |
| KR | 10-2014-0088465 A | 7/2014 |
| KR | 10-1619468 B1 | 5/2016 |
| KR | 10-1690297 B1 | 12/2016 |
| KR | 10-2019-0001896 A | 1/2019 |
| KR | 10-2019-0130147 A | 11/2019 |
| KR | 10-2020-0031666 A | 3/2020 |
| WO | 2014/078037 A2 | 5/2014 |
| WO | 2019/181153 A1 | 9/2019 |

* cited by examiner (660)

(650)

(630)

METHOD AND APPARATUS FOR DISPLAYING VIRTUAL OBJECTS IN DIFFERENT BRIGHTNESSES

CROSS-REFERENCE TO RELATED APPLICATION(S)

This application is a continuation application, claiming priority under § 365(c), of an International application No. PCT/KR2021/005752, filed on May 7, 2021, which is based on and claims the benefit of a Korean patent application number 10-2020-0086326, filed on Jul. 13, 2020, in the Korean Intellectual Property Office, the disclosure of which is incorporated by reference herein in its entirety.

BACKGROUND

1. Field

The disclosure relates to a method and an apparatus for differently displaying brightness of virtual objects.

2. Description of Related Art

With the development of digital technologies, various types of electronic devices such as mobile communication terminals, personal digital assistants (PDAs), electronic organizers, smartphones, tablet personal computers (PCs), and wearable devices have become widely used.

For example, the electronic device may provide virtual reality (VR) that allows a user to have experience like the real thing in a virtual world made by a computer. Further, the electronic device may provide augmented reality (AR) adding virtual information (or virtual objects) to the real world to show the same and mixed reality (MR) generated by mixing virtual reality and augmented reality. In order to provide the virtual reality and the augmented reality, a head-mounted display is provided.

When displaying virtual objects corresponding to different real objects, the electronic device providing VR or AR may display a plurality of virtual objects at the same brightness. In spite of a distance difference between a plurality of different real objects, the plurality of virtual objects are displayed at the same brightness, and thus the user may have difficult in intuitively recognizing which object is close and which object is far. In order to compensate for this, it is possible to display distance information when displaying virtual objects, but the display size of the distance information is too small to be intuitively recognized by the user, so that the user may still have difficulty in recognizing the distance of the real object or the virtual object.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for providing expression of modeling to a user and operating an electronic device with low power by differently displaying brightness of virtual objects according to the distance between real objects.

Additional aspects will be set forth in part in the description which follows and, in part, will be apparent from the description, or may be learned by practice of the presented embodiments.

In accordance with an aspect of the disclosure, an electronic device is provided. The electronic device includes an illuminance sensor, a camera module, a display module, a memory, and a processor operatively connected to the illuminance sensor, the camera module, the display module, and the memory, wherein the processor is configured to measure illuminance through the illuminance sensor, configure brightness of a first virtual object, based on the measured illuminance, identify a distance between the first virtual object and a second virtual object, configure brightness of the second virtual object, based on the brightness of the first virtual object and the identified distance, and control displaying of the first virtual object and the second virtual object through the display module, based on the configured brightness.

In accordance with another aspect of the disclosure, a system for displaying virtual objects is provided. The system includes an augmented reality (AR) device configured to acquire image data through a camera module, measure illuminance through an illuminance sensor, transmit the image data and the measured illuminance value to an external device, and display virtual objects, based on display information of the virtual objects received from the external device, and the external device configured to receive the image data and the measured illuminance value from the AR device, analyze the image data, configure brightness of a first virtual object included in the image data, based on the measured illuminance, identify a distance between the first virtual object and a second virtual object, configure brightness of the second virtual object, based on the brightness of the first virtual object and the identified distance, and transmit display information of virtual objects including the brightness configured in the first virtual object and the second virtual object to the AR device.

In accordance with another aspect of the disclosure, a method for operating an electronic device is provided. The method includes measuring illuminance through an illuminance sensor of the electronic device, configuring brightness of a first virtual object, based on the measured illuminance, identifying a distance between the first virtual object and a second virtual object, configuring brightness of the second virtual object, based on the brightness of the first virtual object and the identified distance, and controlling displaying of the first virtual object and the second virtual object through a display module of the electronic device, based on the configured brightness.

According to various embodiments, it is possible to reduce current consumption of an electronic device compared to equally displaying brightness of virtual objects by differently displaying brightness of virtual objects according to the distance between real objects.

According to various embodiments, it is possible to allow a user to intuitively recognize the distance of a real object or a virtual object by differently displaying brightness of virtual objects according to the distance between real objects.

According to various embodiments, when the distance between the real object and the electronic device becomes longer, the size of the virtual object may be displayed to be smaller and brightness of the object may be displayed to be darker, and when the distance between the real object and the electronic device becomes shorter, the size of the virtual object may be displayed to be larger and/or brightness of the virtual object may be displayed to be brighter, and thus natural depth can be expressed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
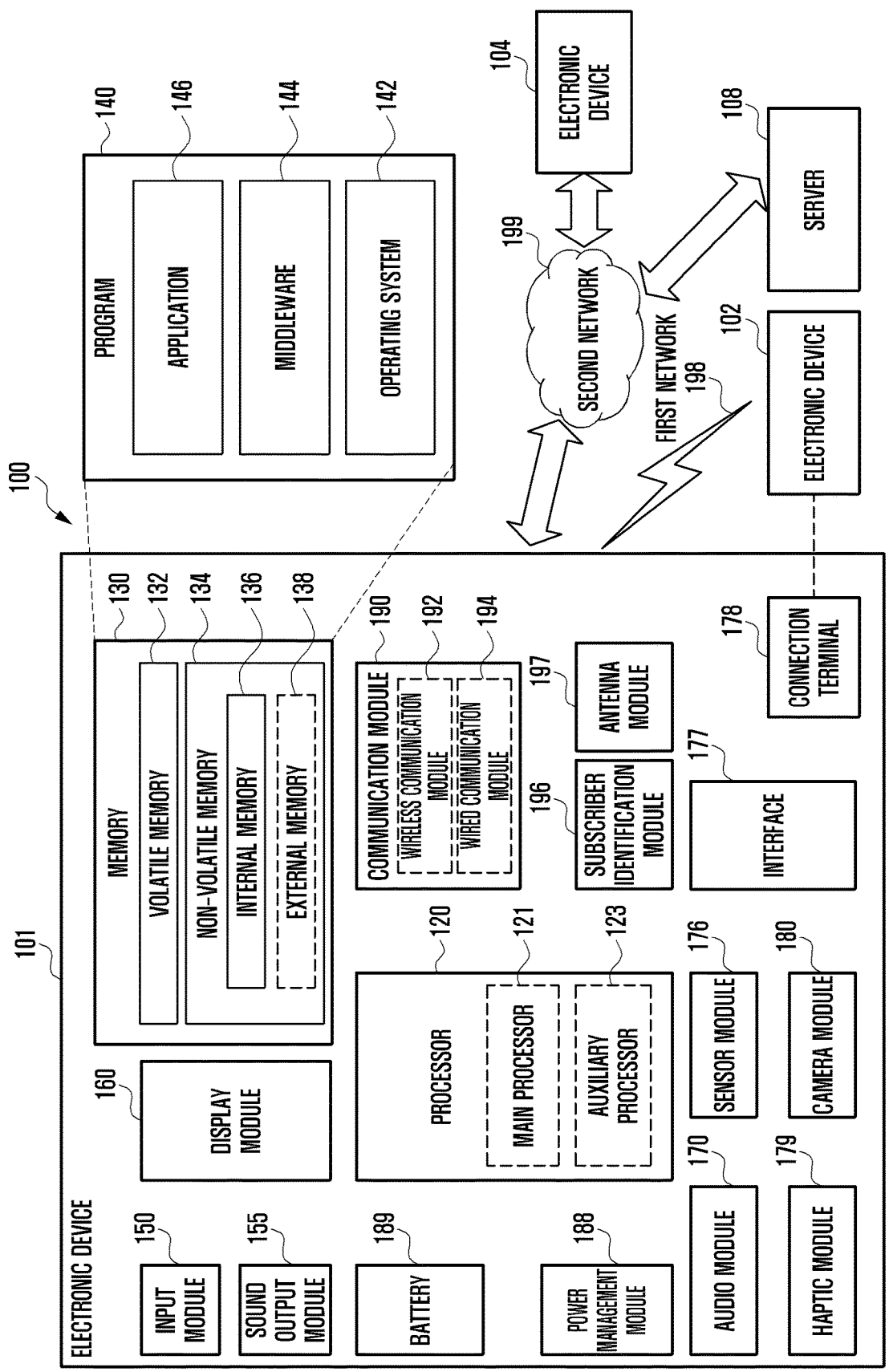
FIG. 1 is a block diagram illustrating an electronic device within a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
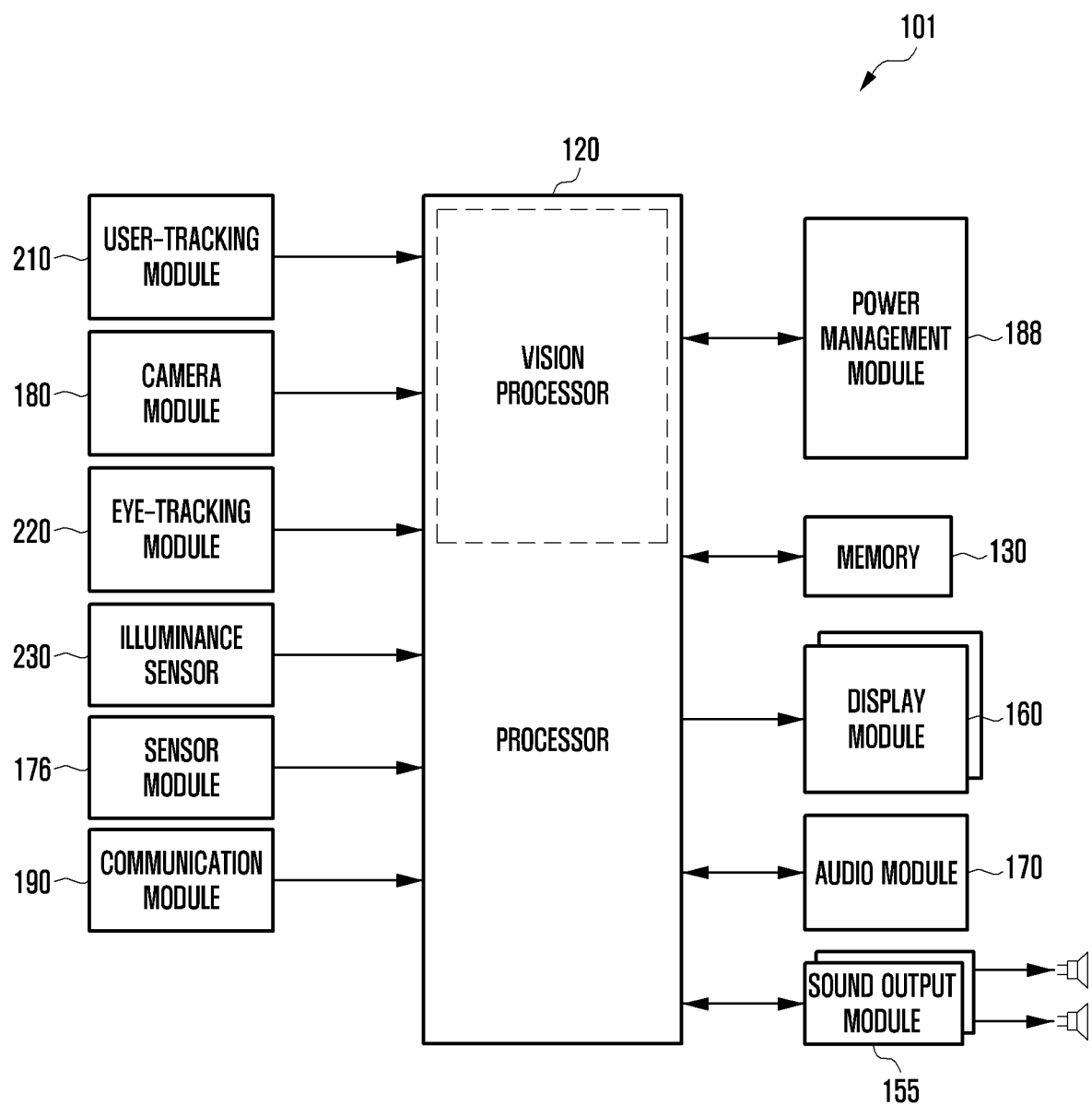
FIG. 2 is a block diagram illustrating an electronic device according to an embodiment of the disclosure.

FIG. 2 is a block diagram illustrating an electronic device according to an embodiment of the disclosure.

Referring to FIG. 2, the electronic device 101 may include a head-mounted display. Hereinafter, the same term and the same reference numeral may be used for an element which is the same as that of FIG. 1. The electronic device 101 may include a user-tracking module 210, the camera module 180, an eye-tracking module 220, an illuminance sensor 230, the sensor module 176, the communication module 190, the processor 120, the power management module 188, the memory 130, the display module 160, the audio module 170, and the sound output module 155. The electronic device 101 may have the same elements as those of the electronic device 101 of FIG. 1 (for example, the processor 120 or the camera module 180), or another element which is not included in the electronic device 101 (for example, the user-tracking module 210) may further included. A detailed description of the same elements as those of the electronic device 101 may be omitted. The processor 120 may include a vision processor. The vision processor may execute a machine vision algorithm such as a convolution neural network (CNN) or a scale-invariant feature transform (SIFT).

The user-tracking module 210 may track movement of a user's head wearing the electronic device 101. For example, the user-tracking module 210 may put the center of the user's head wearing the electronic device 101 on the origin of three-dimensional coordinates, track up/down/left/right movement of the head, and reflect the movement in the screen displayed on the display module 160. For example, the screen displayed on the display module 160 may be automatically changed following movement of the user's head. The user-tracking module 210 may use an accelerometer sensor, a gyroscope sensor, and a magnetometer sensor in order to detect a location value according to head movement. The accelerometer sensor, the gyroscope sensor, or the magnetometer sensor may be included in the sensor module 176. The user-tracking module 210 may acquire a location value according to head movement through a magnet sensor, a 6-axis sensor, a proximity sensor, or an infrared camera. The electronic device 101 may further include a magnet sensor, a 6-axis sensor, a proximity sensor, or an infrared camera. The magnet sensor, the 6-axis sensor, and the proximity sensor may be included in the sensor module 176.

The eye-tracking module 220 may track eyes or movement of the user wearing the electronic device 101. The eye-tracking module 220 may track eyes or movement of the user through the sensor module 176 added close to the user's eyes when the user wears the electronic device 101, the camera module 180, or a mirror. Eye tracking may use a user interface (UI) technology for operating a device (for example, cursor movement or selection) through a specific eye action such as continuous gaze or blink. In a virtual reality (VR) field, foveated rendering of expressing emotion through a virtual character of the user or clearly implementing a part where eyes stay may be applied.

The illuminance sensor 230 may measure an amount of ambient light (for example, illuminance) in real time or periodically. The processor 120 may control brightness of the screen displayed on the display module 160 according to illuminance measured by the illuminance sensor 230. The processor 120 may configure brightness of a virtual object according to current illuminance and a distance of the virtual object (or a distance of the real object) displayed on the display module 160. The virtual object may include a VR virtual object displayed in virtual reality (VR) or an AR virtual object displayed in augmented reality (AR). The virtual object may be configured by at least one of text, images, or videos. The processor 120 may configure brightness of the virtual object to be dark when the currently measured illuminance of the display module 160 is low and configure brightness of the virtual object to be bright when the measured illuminance is high. The processor 120 may configure brightness of the virtual object corresponding to the real object located (or arranged) to be the closest to the current location of the user to be most bright and configure brightness of the virtual object to be darker as the distance of the real object becomes farther from the current location of the user.

The electronic device 101 may store a brightness table according to the distance in the memory 130. The processor 120 may configure brightness of the virtual object according to the distance with reference to the brightness table stored in the memory 130. In the brightness table, brightness (or a brightness intensity or a brightness degree) according to the distance may be configured on the basis of an inverse square law stating that a physical quantity such as gravitation or brightness is inversely proportional to the square of the distance. For example, in the brightness table, brightness of the virtual object corresponding to the real object may be configured to brighter (or the intensity of brightness may be configured to be brighter) as the distance to the real object is shorter (for example, smaller), and brightness of the virtual object corresponding to the real object may be configured to be darker (or the intensity of brightness may be configured to be darker) when the distance to the real object is longer (for example, larger). The current consumption of the electronic device 101 becomes smaller as the brightness intensity (brightness degree) is smaller, and the current consumption of the electronic device 101 may become larger as the brightness intensity is larger. Since the current consumption of the electronic device 101 can be significantly reduced through a decrease in the brightness intensity, the electronic device 101 may differently configure brightness intensities of respective virtual objects to reduce current consumption of the electronic device 101. According to an embodiment, the brightness table may include brightness information based on the distance between the head-mounted display and the real object or brightness information based on the distance between real objects (or virtual objects).

According to various embodiments, the processor 120 may configure brightness of the object on the basis of at least one of the current illuminance, the distance between real objects (or virtual objects), an operation state of the electronic device 101, or whether the electronic device 101 moves. The processor 120 may control the object to be displayed at the configured brightness.

Although not illustrated, according to an embodiment, the electronic device (for example, the head-mounted display) may include a first transparent member and/or a second transparent member. The first transparent member and/or the second transparent member may be made of a glass plate or polymer or may be produced to be transparent or translucent. According to an embodiment, the first transparent member may be arranged to face a right eye of the user, and the second transparent member may be arranged to face a left eye of the user. For example, in the first transparent member, a first surface may be arranged to face the right eye of the user and may transmit at least some of the light incident through a second surface and allow the light to be received by the right eye of the user. For example, in the second transparent member, a third surface may be arranged to face the left eye of the user and may transmit at least some of the light incident through a fourth surface and allow the light to be received by the left eye of the user. The first transparent member and/or the second transparent member may be transparent or translucent, receive the light through the second surface and/or the fourth surface, combine an image output from the display module 160 and the incident light output through the second surface and/or the fourth surface, and provide the combined image and light to the user. Even though no image is output from the display module 160, the electronic device (for example, the head-mounted display) may provide the user with the light incident through the second surface of the first transparent member and/or the fourth surface of the second transparent member.

According to an embodiment, when the user wears the electronic device 101, the electronic device 101 may operate in a standalone type and control the object to be displayed. According to another embodiment, the electronic device 101 may be wiredly or wirelessly connected to an external electronic device (for example, the electronic device 102 or the electronic device 104 of FIG. 1) to receive data for displaying the object from the external electronic device and display the object through the display module 160.

An electronic device (for example, the electronic device 101 of FIG. 1) according to various embodiments may include an illuminance sensor (for example, the illuminance sensor 230 of FIG. 2), a camera module (for example, the camera module 180 of FIG. 1), a display module (for example, the display module 160 of FIG. 1), a memory (for example, the memory 130 of FIG. 1), and a processor (for example, the processor 120 of FIG. 1) operatively connected to the illuminance sensor, the camera module, the display module, and the memory, wherein the processor may be configured to measure illuminance through the illuminance sensor, configure brightness of a first virtual object, based on the measured illuminance, identify a distance between the first virtual object and a second virtual object, configure brightness of the second virtual object, based on the brightness of the first virtual object and the identified distance, and control displaying of the first virtual object and the second virtual object through the display module, based on the configured brightness.

The processor may be configured to identify depth information to display the first virtual object and the second virtual object on the display module and configure brightness of the second virtual object, based on the brightness of the first virtual object and the identified depth information.

The memory may include a brightness table in which brightness for each distance is configured, and the processor may be configured to configure brightness of the second virtual object, based on the brightness of the first virtual object, the identified distance, and the brightness table.

The processor may be configured to identify an operation state of the electronic device and configure brightness of the first virtual object, based on the measured illuminance and the operation state.

The operation state may include at least one of a remaining battery of the electronic device, temperature of the electronic device, a mode configured in the electronic device, or information on applications being executed.

The processor may be configured to configure a reference value for configuring object brightness, based on the operation state, and do not limit the configuration of brightness of the first virtual object when the reference value is high and control the brightness of the first virtual object not to be larger than or equal to a brightness reference value when the reference value is low.

The first virtual object or the second virtual object may include a VR virtual object displayed in virtual reality or an AR virtual object displayed in augmented reality.

The processor may be configured to, when the first virtual object or the second virtual object is a virtual object based on a real world, identify a first real object and a second real object in the real world from a preview image acquired through the camera module, match the first virtual object to correspond to the first real object, match the second virtual object to correspond to the second real object, acquire location information including the first real object and the second real object, and determine a distance between the first virtual object and the second virtual object, each of which matches according to a distance difference of the first real object and the second real object, based on the location information.

The processor may be configured to acquire location information of the electronic device and control brightness of the first virtual object or brightness of the second virtual object, based on the location information.

The processor may be configured to determine whether location information of the electronic device is changed while displaying of the first virtual object and the second virtual object is controlled, identify the location information of the electronic device and a distance between the first virtual object and the second virtual object when the location information of the electronic device is changed, and control the brightness of the first virtual object and the brightness of the second virtual object, based on the changed distance.

A system for displaying virtual objects according to various embodiments may include an augmented reality (AR) device (for example, the electronic device 101 of FIG. 1) configured to acquire image data through a camera module, measure illuminance through an illuminance sensor, transmit the image data and the measured illuminance value to an external device, and display virtual objects, based on display information of the virtual objects received from the external device, and the external device (for example, the electronic device 101 or the server 108 of FIG. 1) configured to receive the image data and the measured illuminance value from the AR device, analyze the image data, configure brightness of a first virtual object included in the image data, based on the measured illuminance, identify a distance between the first virtual object and a second virtual object, configure brightness of the second virtual object, based on the brightness of the first virtual object and the identified distance, and transmit display information of virtual objects including the brightness configured in the first virtual object and the second virtual object to the AR device.

The AR device may be configured to identify location information through a communication module and transmit the identified location information to the external device, and the external device is configured to configure the brightness of the first virtual object, based on the location information of the AR device and the measured illuminance.

When the location information is changed, the AR device may be configured to transmit the changed location information to the external device and the external device is configured to change the display information of the virtual objects, based on the changed location information and transmit the changed display information to the AR device.

When the location information is changed, the AR device may be configured to acquire image data from the changed location information and transmit the image data and the changed location information to the external device and the external device is configured to change the display information of the virtual objects, based on the image data and the changed location information and transmit the changed display information to the AR device.

Figure 3:
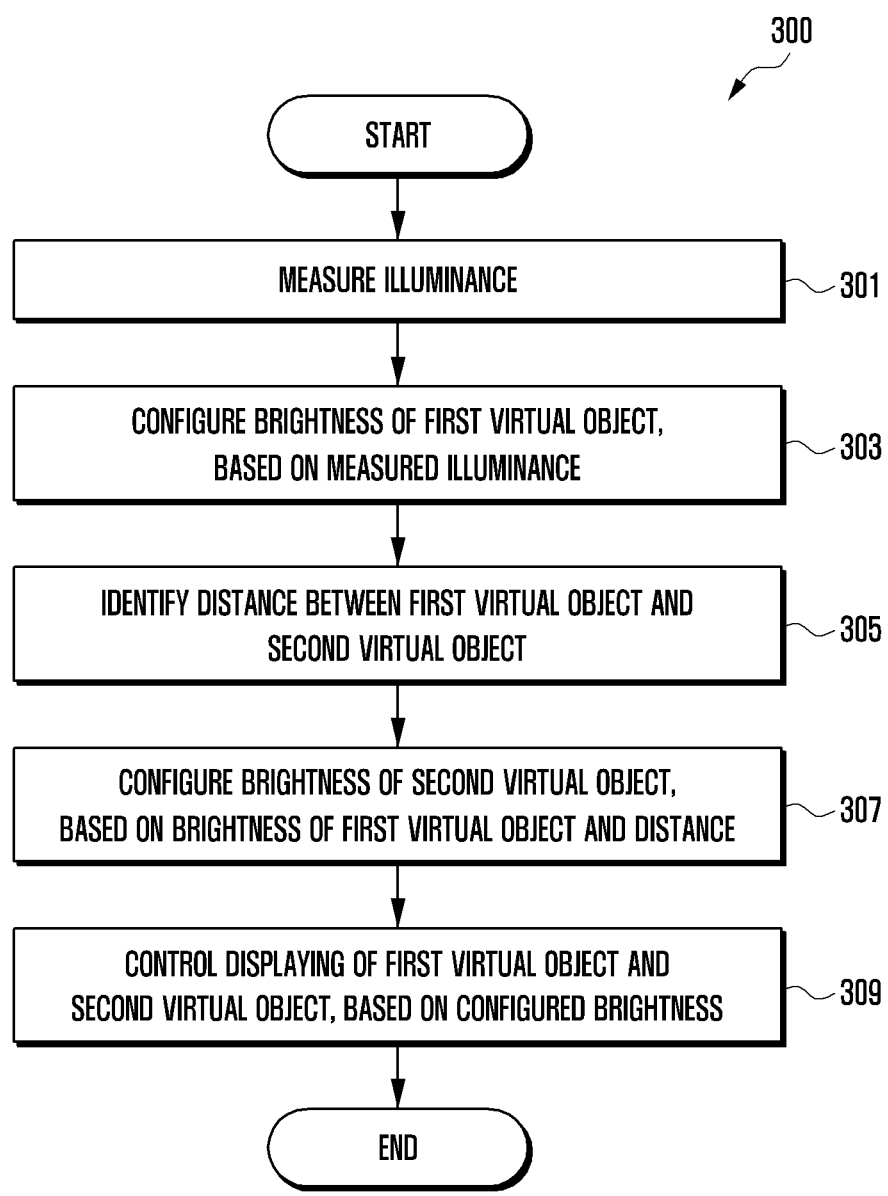
FIG. 3 is a flowchart illustrating an operation method of the electronic device according to an embodiment of the disclosure.

FIG. 3 is a flowchart illustrating a method of operating an electronic device according to an embodiment of the disclosure.

Referring to FIG. 3 depicting flowchart 300, in operation 301, a processor (for example, the processor 120 of FIG. 1) of an electronic device (for example, the electronic device 101 of FIG. 1 or 2) according to various embodiments may measure illuminance. The processor 120 may periodically or selectively measure illuminance around the electronic device 101 in real time through an illuminance sensor (for example, the sensor module 176 of FIG. 1 or the illuminance sensor 230 of FIG. 2). For example, when a real object is recognized in an image (for example, a preview image) acquired from a camera module (for example, the camera module 180 of FIG. 1) or a virtual object should be displayed on a display module (for example, the display module 160 of FIG. 1), the processor 120 may measure illuminance. The virtual object may include a virtual object (for example, a VR virtual object) displayed in virtual reality or a virtual object (for example, an AR virtual object) displayed in augmented reality. The virtual object may be configured by at least one of text, images, or videos.

In operation 303, the processor 120 may configure brightness of a first virtual object on the basis of the measured illuminance. The first virtual object may mean a representative virtual object among at least one virtual object which should be displayed by the processor 120. For example, the first virtual object may include at least one of a virtual object located (or arranged) at the closest distance to the electronic device 101, the largest virtual object in size, or the most important virtual object. The processor 120 may configure brightness of the first virtual object on the basis of the illuminance measured in operation 301. For example, the processor 120 may configure brightness of the first virtual object to be bright when the measured illuminance is high, and configure brightness of the first virtual object to be dark when the measured illuminance is low.

In operation 305, the processor 120 may identify the distance between the first virtual object and a second virtual object. The second virtual object may be a virtual object which is not the first virtual object among at least one virtual object which should be displayed by the processor 120. In an embodiment, when the virtual object which should be displayed by the processor 120 is only one object corresponding to the first virtual object, operation 305 and operation 307 may be omitted. When the number of virtual objects which should be displayed by the processor 120 is only one, another virtual object except for the first virtual object may be recognized as the second virtual object. In an embodiment, when the number of second virtual objects is two or more, virtual objects (for example, the second virtual object, a third virtual object, . . . , or an N$^{th}$ virtual object) except for the first virtual object may be separated and the distance to the respective virtual objects (for example, the second virtual object, the third virtual object, . . . , or the N$^{th}$ virtual object) may be identified. For example, the processor 120 may identify the distance between the first virtual object and the second virtual object or the distance between the first virtual object and the third virtual object.

According to an embodiment, the processor 120 may identify depth information of each virtual object to be displayed on the display module 160 and compare the depth information of the virtual objects to identify the distance between virtual objects. The depth information may be acquired through the camera module 180 such as a depth camera or may be included in the virtual object.

In operation 307, the processor 120 may configure brightness of the second virtual object on the basis of the brightness of the first virtual object and the distance (for example, the relatively distance to the first virtual object). The electronic device 101 may store the brightness table according to the distance in the memory (for example, the memory 130 of FIG. 1). In the brightness table, brightness (brightness information) according to the distance may be configured on the basis of an inverse square law stating that a physical quantity such as gravitation or brightness is inversely proportional to the square of the distance. For example, in the brightness table, brightness of the virtual object may be configured to brighter (or the intensity of brightness may be configured to be brighter) as the distance to the real object is shorter (for example, smaller), and brightness of the virtual object may be configured to be darker (or the intensity of brightness may be configured to be darker) when the distance is longer (for example, larger). The correlation between the distance and the brightness may be an inverse proportional relation. The processor 120 may configure brightness of the second virtual object with reference to the brightness table. For example, when the brightness of the first virtual object is 100 (lux) and the distance between the first virtual object and the second virtual object is 1 m, the processor 120 may configure the brightness of the second virtual object as 50 (lux). Alternatively, when the brightness of the first virtual object is 100 (lux) and the distance between the first virtual object and the second virtual object is 3 m, the processor 120 may configure the brightness of the second virtual object as 30 (lux).

In operation 309, the processor 120 may control displaying of the first virtual object and the second virtual object on the basis of the configured brightness. The processor 120 may control displaying of the virtual object by rendering the screen including the virtual object to display the virtual object. In an embodiment, when a first real object corresponding to the first virtual object is closer to the electronic device 101 than a second real object corresponding to the second virtual object, the processor 120 may display the first virtual object to be brighter than the second virtual object. In another embodiment, when a first object corresponding to the first virtual object is closer to the electronic device 101 than a second object corresponding to the second virtual object (for example, visually closer to a user using the electronic device 101) and the second object is closer to the electronic device 101 than a third object corresponding to the third virtual object, the processor 120 may differently display brightness in the order of the first virtual object, the second virtual object, and the third virtual object. For example, the processor 120 may display the brightness of the first virtual object as 20 (lux), the brightness of the second virtual object as 15 (lux), and the brightness of the third virtual object as 5 (lux).

Figure 4:
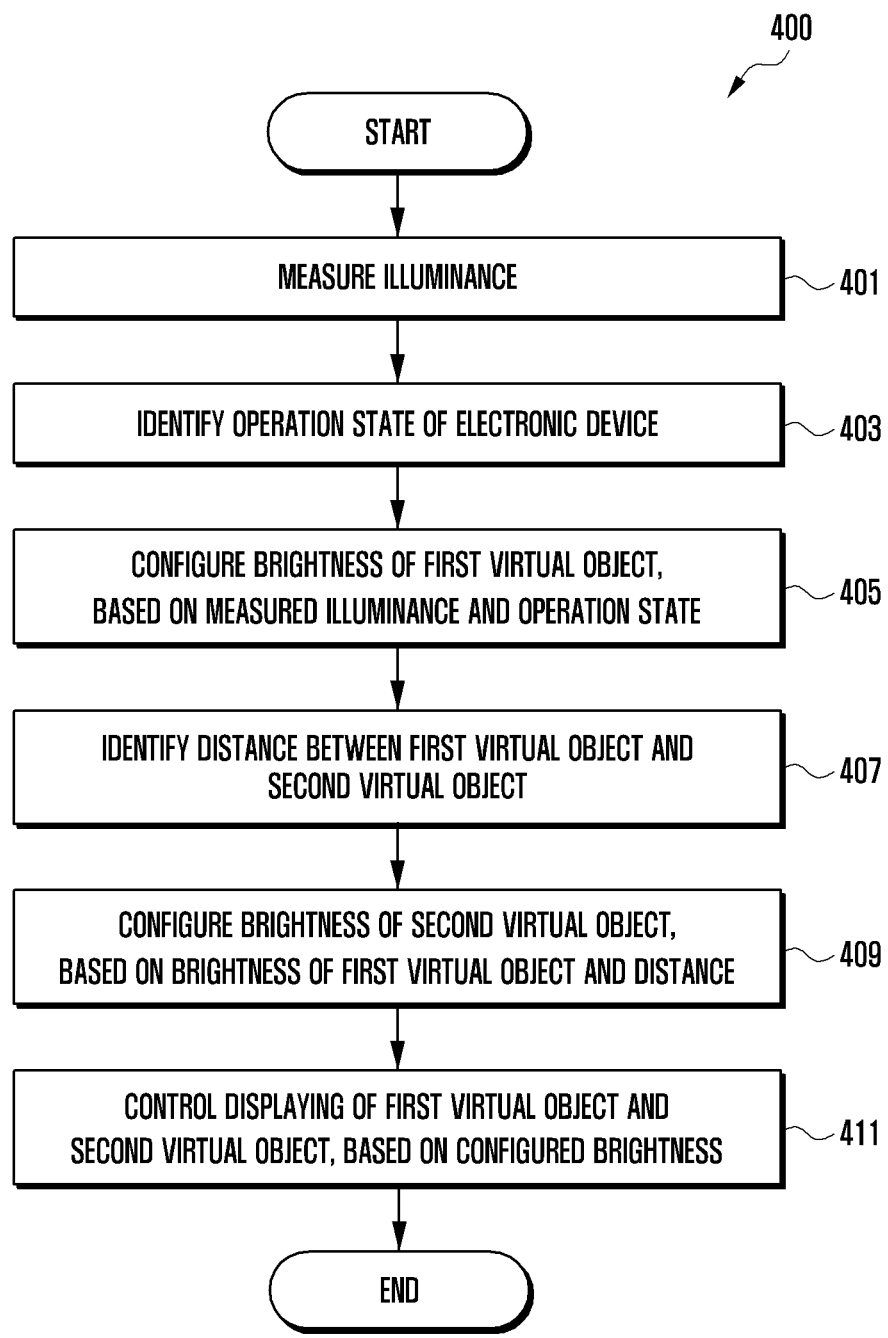
FIG. 4 is a flowchart illustrating a method by which the electronic device controls brightness according to an embodiment of the disclosure.

FIG. 4 is a flowchart illustrating a method of controlling brightness of an object by an electronic device according to an embodiment of the disclosure.

Referring to FIG. 4 depicting flowchart 400, in operation 401, a processor (for example, the processor 120 of FIG. 1) of an electronic device (for example, the electronic device 101 of FIG. 1 or 2) may measure illuminance. The processor 120 may periodically or selectively measure illuminance in real time through an illuminance sensor (for example, the sensor module 176 of FIG. 1 or the illuminance sensor 230 of FIG. 2). Since operation 401 is the same as or similar to operation 301 of FIG. 3, a detailed description thereof may be omitted.

In operation 403, the processor 120 may identify an operation state of the electronic device 101. The operation state may include at least one of the remaining battery (for example, the battery 189 of FIG. 1) of the electronic device 101, temperature of the electronic device 101, a mode (or an operation mode) configured in the electronic device 101, or information on applications being executed. The processor 120 may identify the remaining battery of the electronic device 101 through a power management module (for example, the power management module 188 of FIG. 1). The processor 120 may measure temperature (for example, a degree of heating) of the electronic device 101 through a sensor module (for example, the sensor module 176 of FIG. 1). The mode configured in the electronic device 101 is a mode configured to manage (or operate) the electronic device 101 and may include at least one of, for example, a normal mode, a low-power mode, an ultra-low power mode, or a high-performance mode on the basis of current consumption and/or a processing speed. Information on the applications being executed is information on applications currently executed in the electronic device 101 and may mean, for example, the number of applications.

In operation 405, the processor 120 may configure brightness of a first virtual object on the basis of the measured illuminance and the operation state. The first virtual object may include a VR virtual object displayed in virtual reality or an AR virtual object displayed in augmented reality. The first virtual object may be configured by at least one of text, images, or videos. The first virtual object may mean a representative virtual object among at least one virtual object which should be displayed by the processor 120. For example, the first virtual object may include at least one of a virtual object corresponding to an object located (or arranged) at the closest distance to the electronic device 101, a virtual object corresponding to the largest object in size, or a virtual object corresponding to the important object. For example, the processor 120 may configure brightness of the first virtual object to be bright when the measured illuminance is high, and configure brightness of the first virtual object to be dark when the measured illuminance is low.

According to various embodiments, the processor 120 may configure a reference value for configuring virtual object brightness (for example, high/low or high/medium/low) on the basis of the operation state. The processor 120 may limit brightness (or maximum brightness) according to the operation state. For example, the processor 120 may determine the remaining battery is higher than the reference value (for example, high) when the remaining battery is higher than or equal to a predetermined value (for example, 30%) and determine that the remaining battery is lower than the reference value (for example, low) when the remaining battery is lower than the predetermined value (for example, 30%). In another example, the processor 120 may determine that temperature of the electronic device 101 is higher than a reference value (for example, high) when the temperature is equal to or lower than predetermined temperature (for example, 45 degrees) and determine that the temperature is lower than the reference value (for example, low) when the temperature is higher than the predetermined temperature (for example, 45 degrees). In another example, when the mode (or the operation mode) configured in the electronic device 101 is a power-saving mode or a super power-saving mode, the processor 120 may determine that the reference value is low (for example, low). In another example, when the number of applications being executed in the electronic device 101 is larger than or equal to a predetermined number (for example, 3), the processor 120 may determine that the reference value is low (for example, low). According to an embodiment, the processor 120 may not limit brightness when the reference value is high (for example, high) and limit brightness not to be configured to be larger than or equal to a configured brightness reference value (for example, 100 lux) when the reference value is low (for example, low).

For example, the processor 120 may configure brightness of the first virtual object as first brightness when the measured illuminance is high and the reference value is high (for example, high), configure the brightness of the first virtual object as second brightness darker than the first brightness when the measured illuminance is high and the reference value is low (for example, low), configure the brightness of the first virtual object as third brightness when the measured illuminance is low and the reference value is high (for example, high), and configure the brightness of the first virtual object as fourth brightness darker than the third brightness when the measured illuminance is low and the reference value is low (for example, low). The measured illuminance and the operation state may have a proportional relation. The first brightness may be most bright and the fourth brightness may be darkest. The second brightness and the third brightness may be the same as or different from each other.

In operation 407, the processor 120 may identify the distance between the first virtual object and a second virtual object. The second virtual object may be an object which is not the first virtual object among at least one virtual object which should be displayed by the processor 120. When the number of virtual objects which should be displayed by the processor 120 is only one, another virtual object except for the first virtual object may be recognized as the second virtual object. The number of second virtual objects may be one or more. According to various embodiments, the virtual object may include location information (for example, global positioning system (GPS) information). The processor 120 may identify the distance between virtual objects by comparing location information of the virtual objects. Since operation 407 is the same as or similar to operation 305 of FIG. 3, a detailed description thereof may be omitted.

In operation 409, the processor 120 may configure brightness of the second virtual object on the basis of the brightness of the first virtual object and the distance. The electronic device 101 may store a brightness table according to the distance in a memory (for example, the memory 130 of FIG. 1). In the brightness table, brightness may be configured to be darker (for example, lower) as the distance is longer (for example, higher). The correlation between the distance and the brightness may be an inverse proportional relation. The processor 120 may configure brightness of the second virtual object with reference to the brightness table. When the operation state (for example, the remaining battery, temperature, a configured mode, or information on applications being executed) is not good (for example, low), the processor 120 may configure brightness of the second virtual object on the basis of importance of the second virtual object. When importance of the second virtual object is low, the processor 120 may configure the brightness of the second virtual object to be darker.

According to various embodiments, when the operation state is not good (for example, low) and the number of second virtual objects is one or more, the processor 120 may group the one or more second virtual objects on the basis of the distance to manage the same. The grouping management may be to unify two or more second objects into one brightness rather than to differently apply brightness of the one or more second virtual objects. According to various embodiments, when the operation state is not good, the processor 120 may control a second virtual object which is apart from the first virtual object by a predetermined distance or longer to be not displayed. According to various embodiments, when the operation state is not good, the processor 120 may control displaying of the second virtual object according to importance of the second virtual object within an application for displaying the first virtual object and the second virtual object. The processor 120 may display the second virtual object when importance of the second virtual object is higher and may control the second virtual object to not be displayed when importance of the second virtual object is low.

In operation 411, the processor 120 may control displaying of the first virtual object and the second virtual object on the basis of the configured brightness. The processor 120 may control displaying of the virtual object by rendering the screen including the virtual object to display the virtual object. For example, when the first virtual object is closer to the electronic device 101 than the second virtual object or is visually closer to the user using the electronic device 101, the processor 120 may display the first virtual object to be brighter than the second virtual object. In another example, when the first object is closer to the electronic device 101 than the second object and the second virtual object is closer to the electronic device 101 than the third virtual object, the processor 120 may differently display brightness in the order of the first virtual object, the second virtual object, and the third virtual object. Since operation 411 is the same as or similar to operation 309 of FIG. 3, a detailed description thereof may be omitted.

Figure 5:
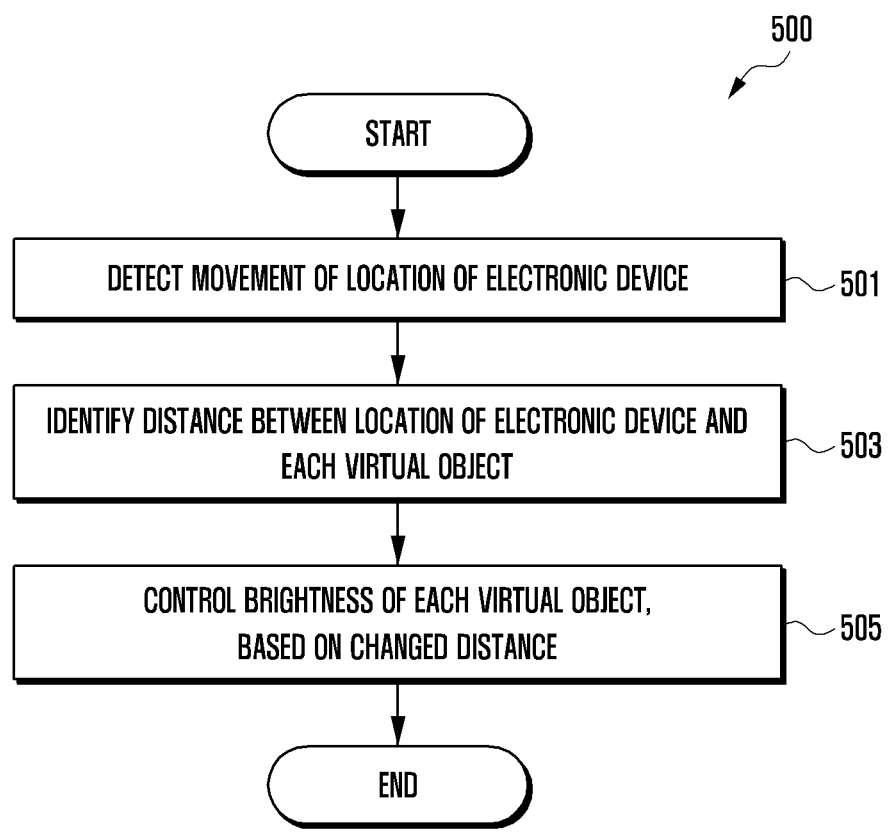
FIG. 5 is a flowchart illustrating a method by which the electronic device controls brightness of virtual objects according to the location of the electronic device and the distance between virtual objects according to an embodiment of the disclosure.

FIG. 5 is a flowchart illustrating a method by which the electronic device controls brightness of virtual objects according to the location of the electronic device and the distance between virtual objects according to an embodiment of the disclosure. The flowchart 500 of FIG. 5 may be performed while operation 309 of FIG. 3 or operation 411 of FIG. 4 is performed.

Referring to FIG. 5, in operation 501, a processor (for example, the processor 120 of FIG. 1) of an electronic device (for example, the electronic device 101 of FIG. 1 or 2) may detect movement of a location of the electronic device 101. The processor 120 may measure the location (or location information) of the electronic device 101 through a communication module (for example, the communication module 190 of FIG. 1) or a sensor module (for example, the sensor module 176 of FIG. 1). The location information of the electronic device 101 may include direction information.

The processor 120 may measure the location of the electronic device 101 in real time through at least one of a GPS module, an ultra-wideband (UWB) module, or a 6-axis sensor. The GPS module or the UWB module may be included in the communication module 190. The processor 120 may determine whether the location of the electronic device 101 changes (or moves) while a virtual object is displayed on a display module (for example, the display module 160 of FIG. 1).

In operation 503, the processor 120 may identify the location of the electronic device 101 and the distance between virtual objects. For example, when a first virtual object and a second virtual object are included in a screen (for example, a user interface) displayed on the display module 160, the processor 120 may identify the distance between the location of the electronic device 101 and the first virtual object and the distance between the location of the electronic device 101 and the second virtual object on the basis of movement of the location of the electronic device 101.

In operation 505, the processor 120 may control brightness of each virtual object on the basis of the changed distance. For example, when performing operation 309 of FIG. 3 or operation 411 of FIG. 4, the processor 120 may display brightness of the first virtual object at 50 (lux) and brightness of the second virtual object at 30 (lux). When the location of the electronic device 101 is changed while and/or after operation 309 of FIG. 3 or operation 411 of FIG. 4 is performed, the distance between the electronic device 101 and each virtual object may be changed according to the change in the location of the electronic device 101. For example, when the distance between the electronic device 101 and each virtual object is longer, the processor 120 may change brightness of the first virtual object displayed at 50 (lux) to 30 (lux) and change brightness of the second virtual object displayed at 30 (lux) to 20 (lux) on the basis of the changed distance. The processor 120 may control brightness of each virtual object on the basis of the changed distance from the brightness table stored in the memory (for example, the memory 130 of FIG. 1). According to various embodiments, the processor 120 may control brightness of each virtual object on the basis of at least one of current illuminance, an operation state of the electronic device 101, or movement of the location of the electronic device 101.

Figure 6A:
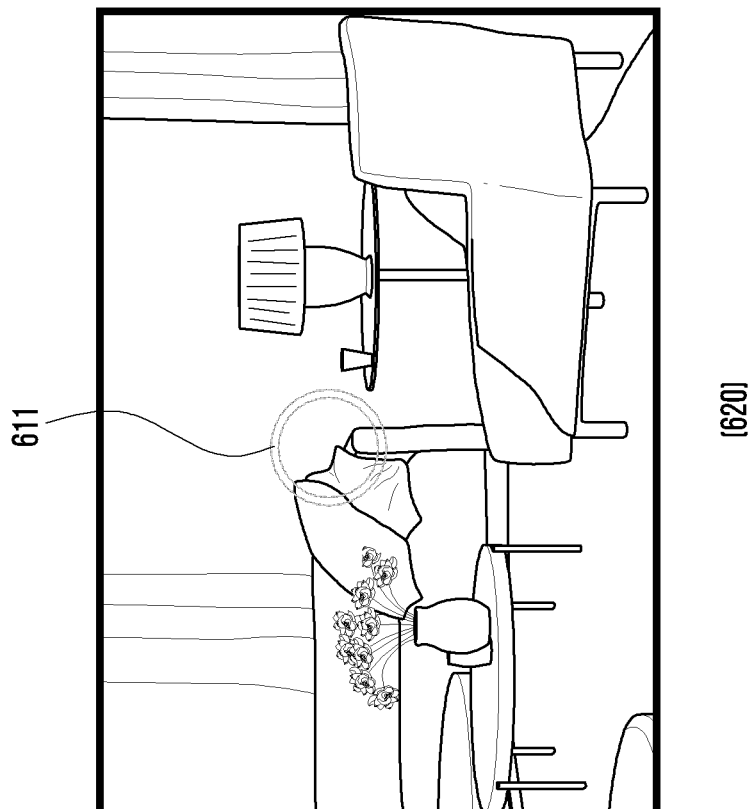
FIGS. 6A and 6B illustrate of differently displaying brightness of virtual objects according to the distance between the electronic device and the virtual object according to various embodiments of the disclosure.
Figure 6A:
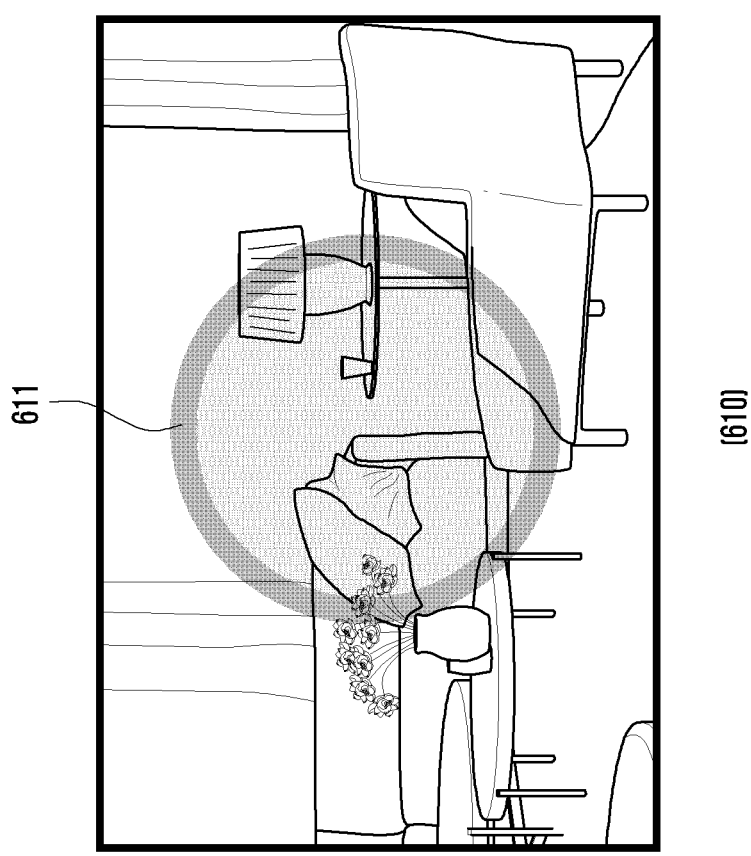
Figure 6B:
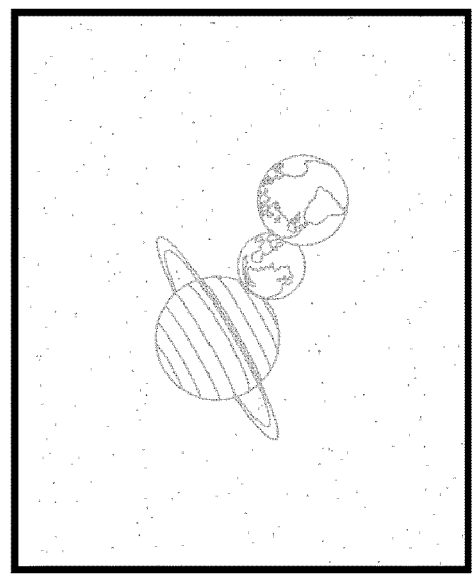
Figure 6B:
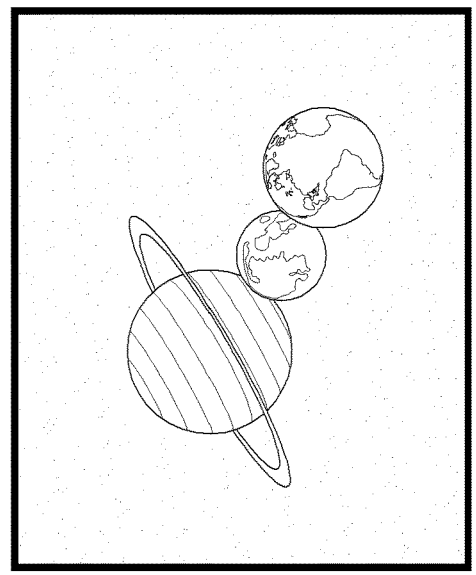
Figure 6B:
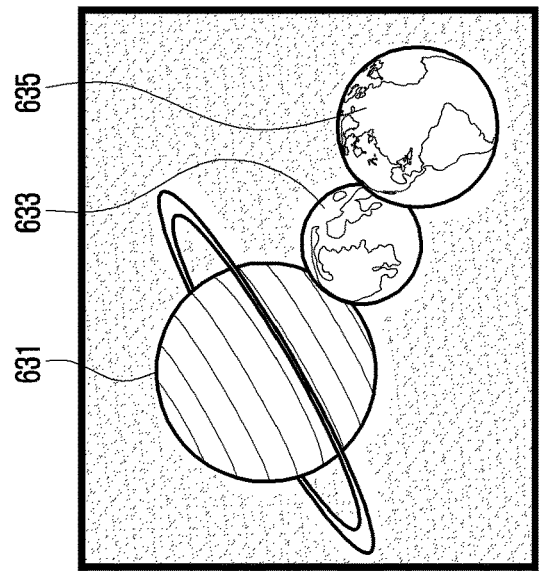

FIGS. 6A and 6B illustrate an example of differently displaying brightness of virtual objects according to the distance between the electronic device and the virtual object according to various embodiments of the disclosure.

Referring to FIG. 6A, an electronic device (for example, the electronic device 101 of FIG. 1 or 2) according to various embodiments may control a first user interface 610 to be provided to the user. For example, the first user interface 610 may display a virtual object 611 in a preview image acquired from a camera module (for example, the camera module 180 of FIG. 1). The virtual object 611 may mean a virtual object displayed in augmented reality. The electronic device 101 may receive light through a transparent member (for example, glass), combine the received light and an image (for example, the virtual object 611) output from the display module 160, and provide the combined light and image to the user. The electronic device 101 may perform control to provide a second user interface 620 to the user on the basis of a user input. For example, the second user interface 620 may change (or control) and display the size and brightness of the virtual object 611 according to a user input.

The electronic device 101 may receive an input of selecting the virtual object 611 and then dragging (or zooming in/out or pinching in/out) or a gesture of controlling the virtual object 611 from the user in the first user interface 610. In an embodiment, the electronic device 101 may display a second user interface 620 in which the size and/or brightness of the virtual object 611 is changed on the basis of the user input. For example, when receiving a user input of making the virtual object 611 spaced farther from the electronic device 101, the electronic device 101 may display the second user interface 620 such that the size of the virtual object 611 is smaller and/or the brightness thereof is brighter than the first user interface 610 on the basis of the changed distance. The electronic device 101 may receive light through a transparent member (for example, glass), combine the received light and an image (for example, the virtual object 611) changed on the basis of a user input, and provide the combined light and image to the user.

Referring to FIG. 6B, the electronic device 101 may perform control to display a third user interface 630 through the display module 160. The third user interface 630 may include a first virtual object 631, a second virtual object 633, and a third virtual object 635. The first virtual object 631, the second virtual object 633, and the third virtual object 635 may be VR virtual objects displayed in virtual reality. For example, when the user views the first virtual object 631 to the third virtual object 635, the electronic device 101 may display the objects such that it may be determined that the first virtual object 631 is closer to the user than the second virtual object 633 and the second virtual object 633 is closer to the user than the third virtual object 635.

The electronic device 101 may configure the size or brightness of the first virtual object 631, and configure the size and/or brightness of the second virtual object 633 and the third virtual object 635 on the basis of the size or the brightness of the first virtual object 631. The electronic device 101 may perform control to display a fourth user interface 650 or a fifth user interface 660 through the display module 160 on the basis of the user input or the change in the location of the electronic device 101.

The fourth user interface 650 or the fifth user interface 660 may configure the size and brightness of the first virtual object 631 according to the user input or the location of the electronic device 101, and change (or control) and display the size and/or brightness of the second virtual object 633 and/or the third virtual object 635 on the basis of the size and/or the brightness of the first virtual object 631. Compared to the third user interface 630, the fourth user interface 650 or the fifth user interface 660 may display the first virtual object 631 to be smaller, display the second virtual object 633 and the third virtual object 635 to be smaller than the first virtual object 631 on the basis of the size of the first virtual object 631, display the first virtual object 631 to be dark, display the second virtual object 633 and the third virtual object 635 to be darker than the first virtual object 631 on the basis of the brightness of the first virtual object 631. The fifth user interface 660 may display the first virtual object 631 to be smaller and display the second virtual object 633 and/or the third virtual object 635 to be smaller than the first virtual object 631 on the basis of the size of the first virtual object 631 compared to the fourth user interface 650, and display the first virtual object 631 to be darker and display the second virtual object 633 and/or the third virtual object 635 to be darker than the first virtual object 631 on the basis of the brightness of the first virtual object 631 compared to the fourth user interface 650.

When the virtual object displayed through the display module 160 in the electronic device 101 according to various embodiments is a VR virtual object displayed in virtual reality, the location at which the VR virtual object is displayed may be stored in the memory (for example, the memory 130 of FIG. 1). For example, the location at which the first virtual object 361 to the third virtual object 365 should be displayed and/or the relative distance between the first virtual object 631 to the third virtual object 635 may be stored in the memory (for example, the memory 130 of FIG. 1). The electronic device 101 may differently display brightness of virtual objects on the basis of the location of the virtual objects stored in the memory (for example, the memory 130 of FIG. 1).

Figure 7:
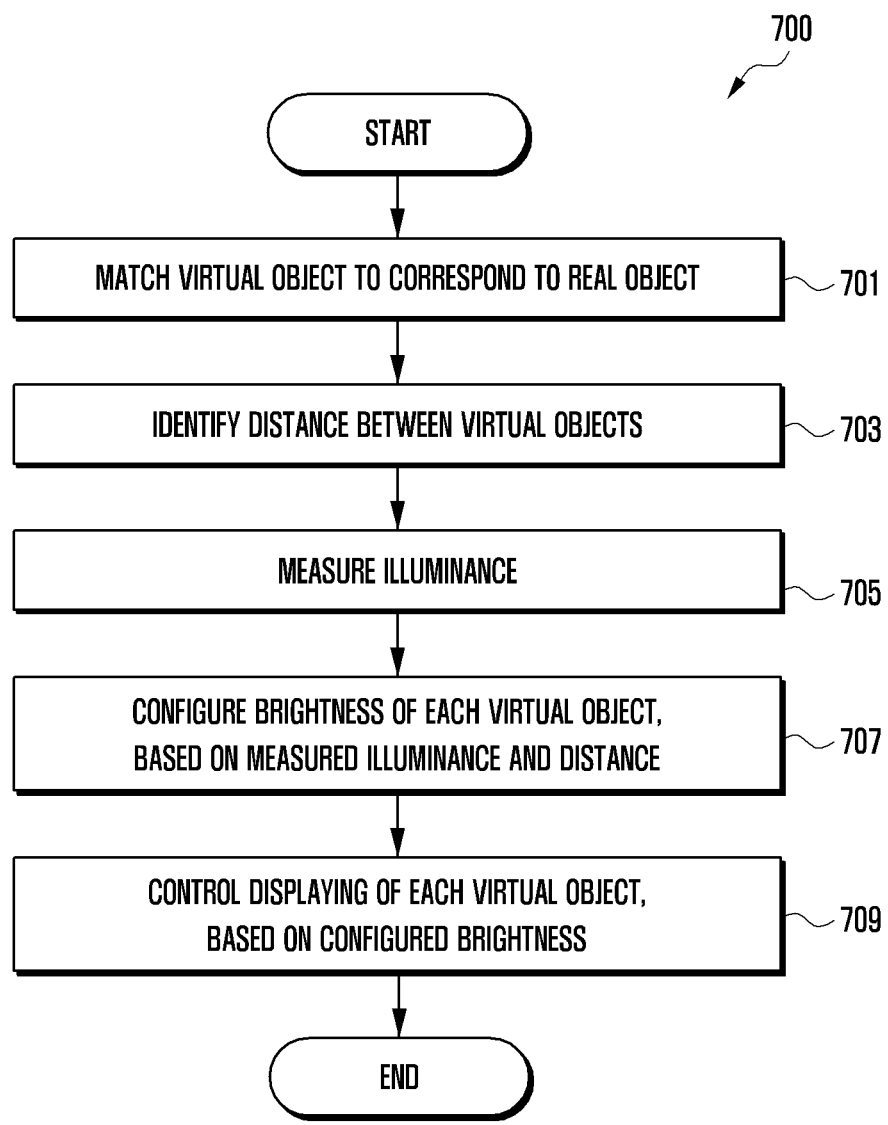
FIG. 7 illustrates a method by which the electronic device controls brightness of virtual objects by matching a real object with a virtual object according to an embodiment of the disclosure.

FIG. 7 is a flowchart illustrating a method by which the electronic device matches a real object and a virtual object and controls brightness of the virtual object according to an embodiment of the disclosure.

Referring to FIG. 7 depicting flowchart 700, in operation 701, a processor (for example, the processor 120 of FIG. 1) of an electronic device (for example, the electronic device 101 of FIG. 1 or 2) may match a virtual object to correspond to a real object according to various embodiments. The virtual object may be a virtual object (for example, an AR virtual object) displayed in augmented reality.

In an embodiment, the processor 120 may recognize a reality object in a preview image acquired from a camera module (for example, the camera module 180 of FIG. 1). For example, the processor 120 may recognize real objects included in the preview image by performing image processing on objects included in the preview image. In another example, the processor 120 may transmit the preview image acquired through the camera module (for example, the camera module 180 of FIG. 1) to an external device (for example, the electronic device 102, the electronic device 104, or the server 108 of FIG. 1) through a communication module (For example, the communication module 190 of FIG. 1), receive an image processing result of the preview image from the external device, and recognize real objects included in the preview image.

In another embodiment, the processor 120 may recognize real objects on the basis of the location of the electronic device 101. For example, the processor 120 may acquire GPS information of the electronic device 101 through a sensor module (for example, the sensor module 176 of FIG. 1) and recognize real objects on the basis of the GPS information. In another example, the processor 120 may transmit GSP information and/or sensor information acquired from a sensor module (for example, the sensor module 176 of FIG. 1) to an external device (for example, the electronic device 102, the electronic device 104, or the server 108 of FIG. 1) through a communication module (for example, the communication module 190 of FIG. 1) and receive information on real objects from the external device.

The processor 120 may match virtual objects to correspond to the recognized real objects. When virtual objects are provided by an application executed by the user, the processor 120 may match the virtual objects to correspond to the real objects. The processor 120 may match the virtual objects with the real objects on the basis of the location of the real objects or the size of the virtual objects. For example, the processor 120 may identify the location to display the virtual objects.

In operation 703, the processor 120 may identify the distance between virtual objects. The number of virtual objects may be one or more, and there may be difference in the distance of the virtual objects. Since the virtual objects match the real objects, the processor 120 may identify the distance between virtual objects from the distance between real objects. For example, the processor 120 may identify the distance between virtual objects on the basis of GPS information of the real objects. In another example, the processor 120 may receive distance difference between virtual objects from the server 108.

In operation 705, the processor 120 may measure illuminance. The processor 120 may periodically or selectively measure illuminance in real time through an illuminance sensor (for example, the sensor module 176 of FIG. 1 or the illuminance sensor 230 of FIG. 2). Since operation 705 is the same as or similar to operation 301 of FIG. 3 or operation 501 of FIG. 5, a detailed description thereof may be omitted. Although the drawings illustrate operation 705 is performed after operation 701 and operation 703, operation 705 may be performed before operation 701 or performed between operation 701 and operation 703 according to various embodiments.

In operation 707, the processor 120 may configure brightness of each virtual object on the basis of the measured illuminance and the distance between virtual objects to be displayed. When the number of virtual objects is one or more, the processor 120 may configure brightness of a representative object (for example, a first virtual object) among the virtual objects on the basis of the measured illuminance and configure brightness of the other virtual objects on the basis of the configured brightness of the representative virtual object and the distance between the representative virtual object and the other virtual objects (for example, the second virtual object). In an embodiment, the processor 120 may configure brightness of each virtual object according to the measured illuminance and the distance with reference to a brightness table stored in the memory (for example, the memory 130 of FIG. 1).

In operation 709, the processor 120 may control displaying of each virtual object on the basis of the configured brightness. The processor 120 may control displaying of the virtual object by rendering the screen including the virtual object to display the virtual object. For example, when the first virtual object is closer to the electronic device 101 than the second virtual object, the processor 120 may display the first virtual object to be brighter than the second virtual object.

Figure 8:
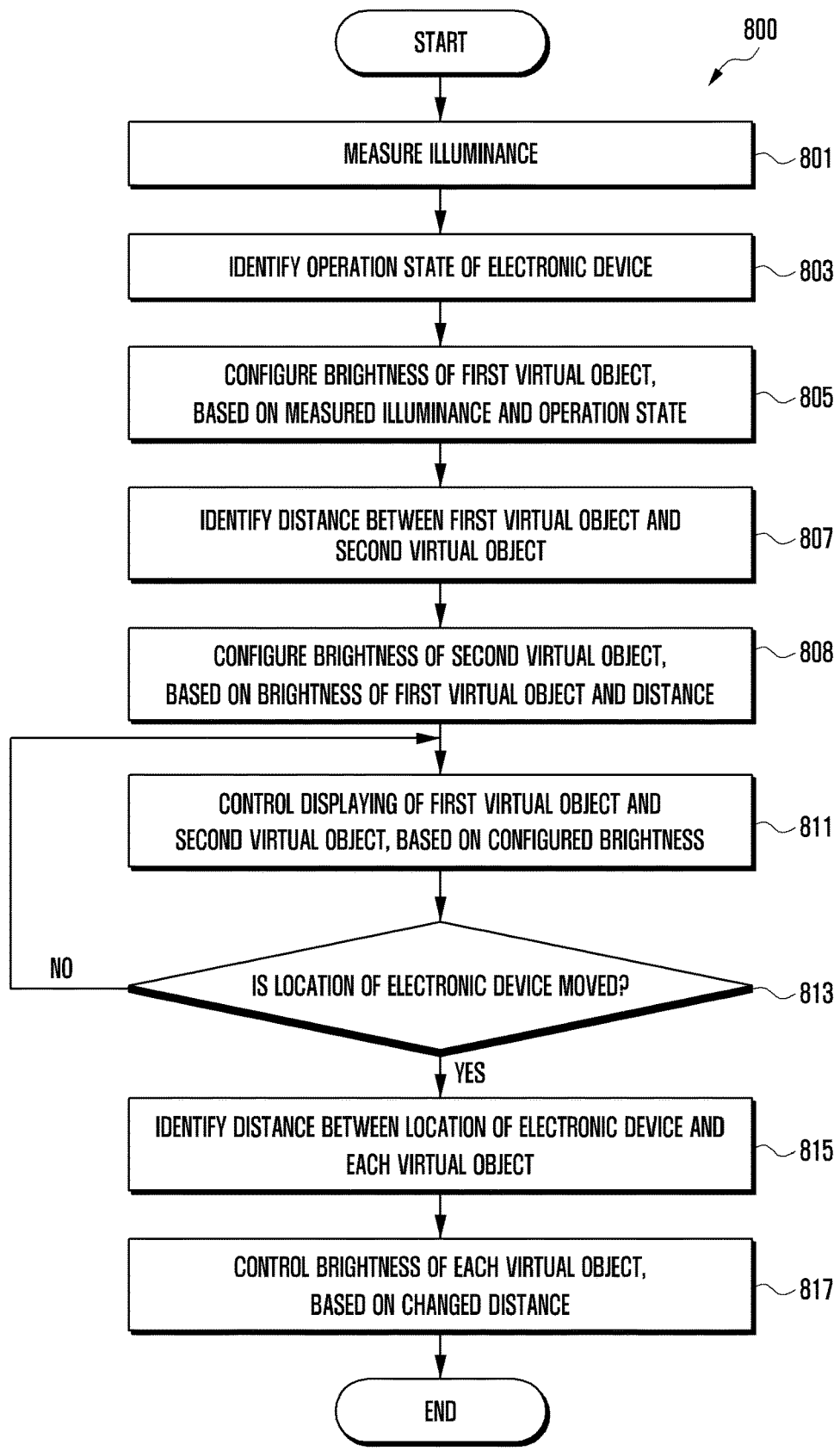
FIG. 8 is a flowchart illustrating a method by which the electronic device controls brightness of objects according to an embodiment of the disclosure.

FIG. 8 is a flowchart illustrating a method by which the electronic device controls brightness of an object according to an embodiment of the disclosure.

Referring to FIG. 8 depicting flowchart 800, in operation 801, a processor (for example, the processor 120 of FIG. 1) of an electronic device (for example, the electronic device 101 of FIG. 1 or 2) according to various embodiments may measure illuminance. The processor 120 may periodically or selectively measure illuminance in real time through an illuminance sensor (for example, the sensor module 176 of FIG. 1 or the illuminance sensor 230 of FIG. 2). Since operation 801 is the same as or similar to operation 301 of FIG. 3 or operation 401 of FIG. 4, a detailed description thereof may be omitted.

In operation 803, the processor 120 may identify an operation state of the electronic device 101. The operation state may include at least one of the remaining battery of the electronic device 101, temperature of the electronic device 101, a mode configured in the electronic device 101, or information on applications being executed. For example, the processor 120 may identify the remaining battery of the electronic device 101 through a power management module (for example, the power management module 188 of FIG. 1). For example, the processor 120 may measure temperature (for example, a degree of heating) of the electronic device 101 through a sensor module (for example, the sensor module 176 of FIG. 1). The mode configured in the electronic device 101 is a mode configured to manage (or operate) the electronic device 101 and may include at least one of, for example, a normal mode, a low-power mode, an ultra-low power mode, or a high-performance mode on the basis of current consumption and/or a processing speed. Information on the application being executed is information on an application currently executed in the electronic device 101 and may mean, for example, the number of applications. Since operation 803 is the same as or similar to operation 403 of FIG. 4, a detailed description thereof may be omitted.

In operation 805, the processor 120 may configure brightness of a first virtual object on the basis of the measured illuminance and the operation state. The first virtual object may include a VR virtual object displayed in virtual reality and an AR virtual object displayed in augmented reality. The first virtual object may be configured by at least one of text, images, or videos. The first virtual object may mean a representative virtual object among at least one virtual object which should be displayed by the processor 120. For example, the first virtual object may include at least one of an object location (or arranged) closest to the electronic device 101, the largest object, or the most important object. For example, the processor 120 may configure brightness of the first virtual object to be bright when the measured illuminance is high, and configure brightness of the first virtual object to be dark when the measured illuminance is low. The processor 120 may configure a reference value for configuring object brightness (for example, high/low or high/medium/low) on the basis of the operation state. The processor 120 may limit brightness (or maximum brightness) according to the operation state. For example, the processor 120 may not limit brightness when the reference value is high and may control the brightness not to be larger than or equal to a brightness reference value (for example, 100 lux) when the reference value is low. Since operation 805 is the same as or similar to operation 405 of FIG. 4, a detailed description thereof may be omitted.

In operation 807, the processor 120 may identify the distance between the first virtual object and a second virtual object. The second virtual object may be a virtual object which is not the first virtual object among at least one object which should be displayed by the processor 120. When the number of virtual objects which should be displayed by the processor 120 is only one, another virtual object except for the first virtual object may be recognized as the second virtual object. The number of second virtual objects may be one or more. According to various embodiments, a real object may include location information (for example, GPS information). The processor 120 may identify the distance between virtual objects by comparing location information of real objects. Since operation 807 is the same as or similar to operation 305 of FIG. 3 or operation 407 of FIG. 4, a detailed description thereof may be omitted.

In operation 808, the processor 120 may configure brightness of the second virtual object on the basis of the brightness of the first virtual object and the distance. The electronic device 101 may store a brightness table according to the distance in a memory (for example, the memory 130 of FIG. 1). In the brightness table, brightness may be configured to be darker (for example, lower) as the distance is longer (for example, higher). The processor 120 may configure brightness of the second virtual object with reference to the brightness table. When the operation state is not good (for example, low), the processor 120 may configure brightness of the second virtual object on the basis of importance of the second virtual object. When importance of the second virtual object is low, the processor 120 may configure the brightness of the second virtual object to be darker. Since operation 808 is the same as or similar to operation 409 of FIG. 4, a detailed description thereof may be omitted.

In operation 811, the processor 120 may control displaying of the first virtual object and the second virtual object on the basis of the configured brightness. The processor 120 may control displaying of the virtual object by rendering the screen including the virtual object to display the virtual object. For example, when the first virtual object is closer to the electronic device 101 than the second virtual object, the processor 120 may display the first virtual object to be brighter than the second virtual object. Alternatively, when the first virtual object is closer to the electronic device 101 than the second virtual object and the second virtual object is closer to the electronic device 101 than the third virtual object, the processor 120 may differently display brightness in the order of the first virtual object, the second virtual object, and the third virtual object. Since operation 811 is the same as or similar to operation 411 of FIG. 4, a detailed description thereof may be omitted.

In operation 813, the processor 120 may determine whether the location of the electronic device 101 is moved. For example, the location of the electronic device 101 may be changed while operation 811 is performed. The processor 120 may identify the location of the electronic device 101 through the communication module 190 and determine whether location information of the electronic device 101 acquired during operation 811 is changed. The location information of the electronic device 101 may include direction information. The processor 120 may measure the location of the electronic device 101 in real time through at least one of a GPS module, a UWB module, or a 6-axis sensor. The processor 120 may perform operation 815 when the location of the electronic device 101 is moved and may return to operation 811 when the location of the electronic device 101 is not moved. The processor 120 may return to operation 811 and control displaying of the first virtual object and the second virtual object. For example, the processor 120 may detect a change in the location of the electronic device 101 periodically while displaying the first virtual object and the second virtual object.

When the location of the electronic device 101 is moved, the processor 120 may identify the distance between the electronic device 101 and each object in operation 815. For example, when a screen (for example, a user interface) displayed on the display module 160 includes the first virtual object and the second object, the processor 120 may identify the distance between the location of the electronic device 101 and the first virtual object and the distance between the location of the electronic device 101 and the second virtual object. Operation 815 may be the same as or similar to operation 503 of FIG. 5.

In operation 817, the processor 120 may control brightness of each object on the basis of the changed distance. According to an embodiment, displaying of the object may be changed on the basis of movement of the location of the electronic device 101. For example, when performing operation 811, the processor 120 may display brightness of the first virtual object at 50 (lux) and brightness of the second virtual object at 30 (lux). When the location of the electronic device 101 is changed during operation 811 or after operation 811, the processor 120 may change the distance between the electronic device 101 and each object according to the change in the location of the electronic device 101. For example, when the distance between the electronic device 101 and a first real object and/or a second real object is longer, the processor 120 may change the brightness of the first virtual object displayed on 50 (lux) to 30 (lux) and change the brightness of the second virtual object displayed at 30 (lux) to 20 (lux) on the basis of the changed distance. The processor 120 may control brightness of each object on the basis of the changed distance from the brightness table stored in the memory 130.

Figure 9:
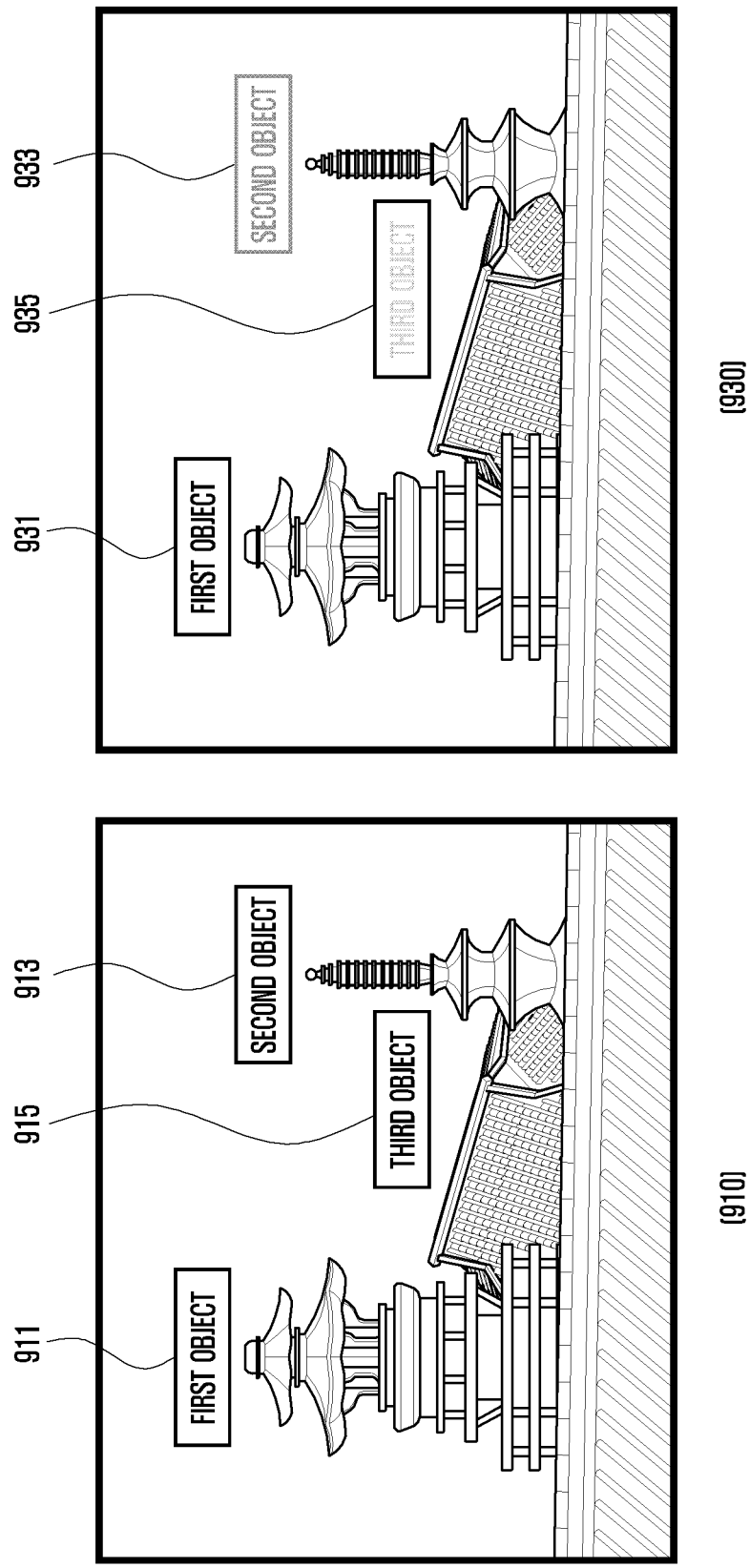
FIG. 9 illustrates in which the electronic device differently displays brightness of virtual objects depending on the distance according to an embodiment of the disclosure.

FIG. 9 illustrates in which the electronic device differently displays brightness of virtual objects depending on the distance according to an embodiment of the disclosure.

Referring to FIG. 9, an electronic device (for example, the electronic device 101 of FIG. 1 or 2) according to various embodiments may differently display brightness of virtual objects according to the distance. For example, the virtual objects may be augmented reality objects displayed according to real objects. The augmented reality objects may be displayed to correspond to real objects. With reference to reference numeral 910 in a comparative example, brightness of a first virtual object 911, a second virtual object 913, and a third virtual object 915 are equally displayed regardless of the distance between objects.

As indicated by reference numeral 930 according to an embodiment of the disclosure, the electronic device 101 may perform control to differently display virtual objects according to the distance between the electronic device 101 and real objects. For examples, a first real object corresponding to the first virtual object 931 may be located closer to the electronic device 101 than a second real object corresponding to the second virtual object 933 or a third real object corresponding to the third virtual object 935. Further, the second real object corresponding to the second virtual object 933 may be located closer to the electronic device 101 than the third real object corresponding to the third virtual object 935.

In an embodiment, the electronic device 101 may acquire location information of the first real object to the third real object from a content provision server (for example, the server 108 of FIG. 1) in order to display the first virtual object 931 to the third virtual object 935. For example, the electronic device 101 may transmit data acquired through the camera module 180 and/or the sensor module 176 of the electronic device 101 to the content provision server (for example, the server 108 of FIG. 1) and acquire location information of the first real object to the third real object from the server. The first virtual object 931 may match the first real object, the second virtual object 933 may match the second real object, and the third virtual object 935 may match the third real object, and thus the electronic device 101 may identify the distance between the first virtual object 931 to the third virtual object 935 on the basis of location information of the first real object to the third real object. According to an embodiment, the electronic device 101 may acquire information on the relative location between the first real object to the third real object from the server.

According to an embodiment, the electronic device 101 may measure illuminance and configure brightness of the first virtual object 931 on the basis of the measured illuminance. The electronic device 101 may configure brightness of the second virtual object 933 or brightness of the third virtual object 935 on the basis of the brightness of the first virtual object 931 and the distance between real objects. For example, the electronic device 101 may configure the brightness of the first virtual object 931 to be most bright (for example, 30), configure the brightness of the second virtual object 933 to be next brighter (for example, 20), and configure the brightness of the third virtual object 935 to be darkest (for example, 15). In another example, when the third real object is spaced apart from the first real object by a predetermined distance or longer or when the brightness of the third virtual object 935 is different from the brightness of the first virtual object 931 by predetermined brightness or more, the electronic device 101 may not display the third virtual object 935. The electronic device 101 may configure the brightness of the second virtual object 933 or the brightness of the third virtual object 935 on the basis of the brightness of the first virtual object 931 based on illuminance measured through an illuminance sensor (for example, illuminance sensor 230 of FIG. 2) and the brightness table stored in the memory (for example, the memory 130 of FIG. 1). The electronic device 101 may express natural depth by controlling brightness of virtual objects according to the distance of the real objects.

Figure 10:
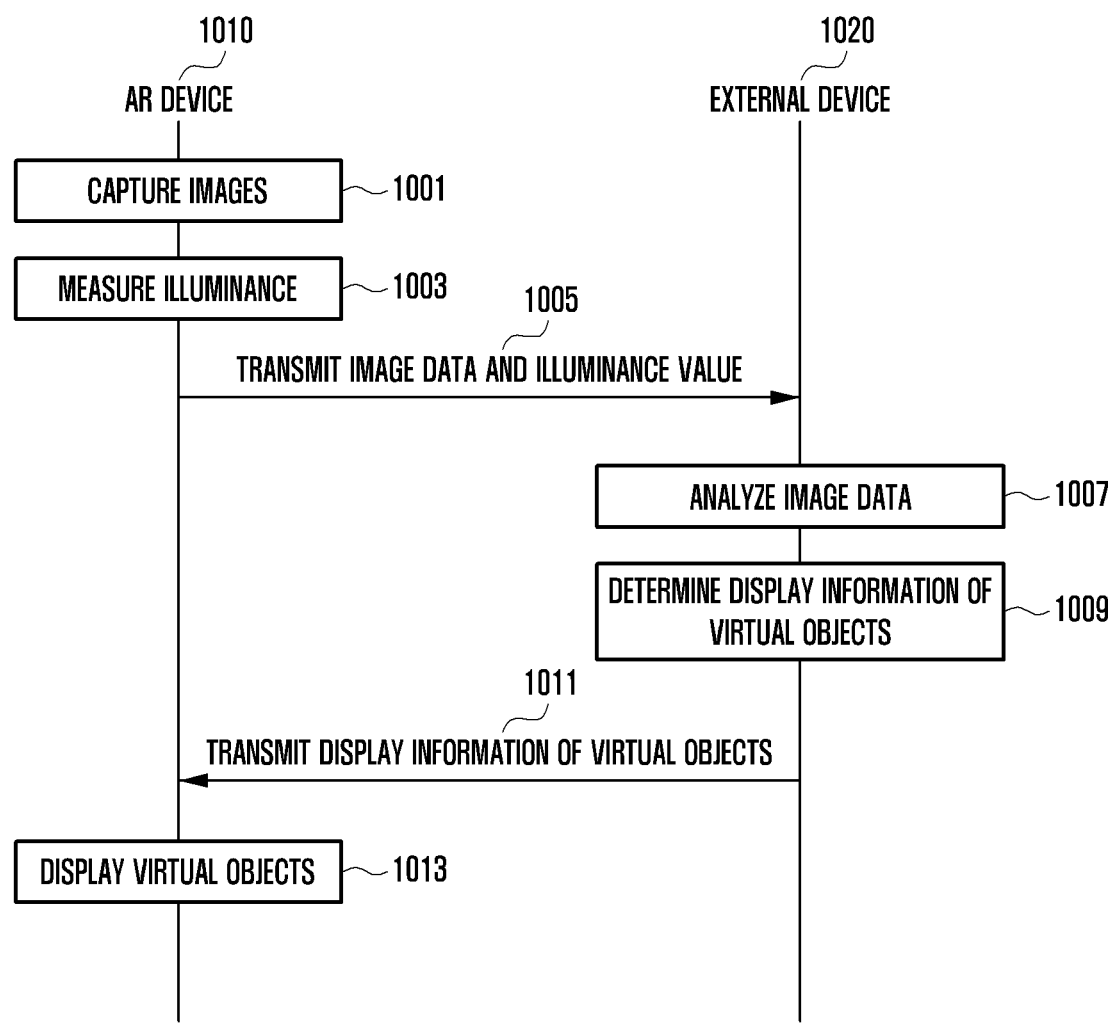
FIG. 10 is a flowchart illustrating a method of operating an AR device and an external device according to an embodiment of the disclosure.

FIG. 10 is a flowchart illustrating a method of operating an AR device and an external device according to an embodiment of the disclosure.

An AR device 1010 (for example, the electronic device 101 of FIG. 1) of FIG. 10 may operate with an external device 1020 (for example, the electronic device 101, the electronic device 104, or the server 108 of FIG. 1) to display virtual objects.

The AR device 1010 according to various embodiments may include a head-mounted display such as AR glasses. The AR device 1010 may include a camera module (for example, the camera module 180 of FIG. 1) for capturing an image, a display module (for example, the display module 160 of FIG. 1) for displaying an image, or an illuminance sensor (for example, the illuminance sensor 230 of FIG. 2) for measuring illuminance. The AR device 1010 may have the same elements (for example, the processor 120 or the camera module 180) as the electronic device 101 of FIG. 1 or may further include another element (for example, the user-tracking module 210) which is not included in the electronic device 101.

Referring to FIG. 10, in operation 1001, the AR device 1010 may capture images through the camera module 180.

In operation 1003, the AR device 1010 may measure illuminance. The AR device 1010 may measure illuminance through an illuminance sensor (for example, the sensor module 176 of FIG. 1 or the illuminance sensor 230 of FIG. 2) in real time, periodically, or selectively. Since operation 1003 is the same as or similar to operation 301 of FIG. 3, a detailed description thereof may be omitted.

In operation 1005, the AR device 1010 may transmit image data and an illuminance value to the external device 1020. The image data may include at least some of the images captured in operation 1001. The illuminance value may include the illuminance value measured in operation 1003. The AR device 1010 may transmit the image data and the illuminance value to the external device 1020 through a communication module (for example, the communication module 190 of FIG. 1). According to an embodiment, in order to transmit the image data and/or the illuminance value, the AR device 1010 and the external device 1020 may be paired. For example, the AR device 1010 and the external device 1020 may be communication-connected through the first network 198 (for example, a short-range wireless communication network) or the second network 199 (for example, a long-range wireless communication network). According to an embodiment, the AR device 1010 may transmit location information of the AR device 1010 to the external device 1020.

In operation 1007, the external device 1020 may analyze image data. The external device 1020 may receive the image data and the illuminance value from the AR device 1010 through a communication module (for example, the communication module 190 of FIG. 1). The external device 1020 may recognize real objects included in the image data and generate at least one virtual object corresponding to the real objects.

In operation 1009, the external device 1020 may determine display information of the virtual objects. The external device 1020 may determine display information of virtual objects included in the image data on the basis of the received illuminance value. The display information of the virtual objects may include brightness information configured for each virtual object. When the number of virtual objects included in the image data is plural, the external device 1020 may configure brightness of a first virtual object and configure brightness of the remaining virtual objects on the basis of the brightness of the first virtual object. The first virtual object may include at least one of a virtual object corresponding to a real object located closest to the AR device 1010 on the basis of location information of the AR device 1010, a virtual object corresponding to the largest real object, or a virtual object corresponding to the important real object. The external device 1020 may identify the distance between the first virtual object and the second virtual object and configure brightness of a second virtual object on the basis of the brightness of the first virtual object and the identified distance.

In operation 1011, the external device 1020 may transmit display information of the virtual objects to the AR device 1010.

In operation 1013, the AR device 1010 may display virtual objects. The AR device 1010 may receive display information of the virtual objects from the external device 1020 and control and display brightness of the virtual objects on the basis of the display information of the virtual objects. For example, the AR device 1010 may display one or more virtual objects having difference in at least some of the brightness configurations between virtual objects through a head-mounted display such as AR glasses.

According to various embodiments, when location information or direction information is changed (for example, movement is detected), the AR device 1010 may transmit the changed location information or direction information to the external device 1020. For example, the changed location information or direction information may include data acquired on the basis of at least one sensor (for example, the sensor module 176 of FIG. 1) of the AR device 1010. The external device 1020 may change display information of the virtual objects on the basis of location information of the AR device 1010 and transmit the display information to the AR device 1010. The AR device 1010 may change and display brightness of the virtual objects on the basis of the changed display information of the virtual objects.

According to various embodiments, when the location information is changed, the AR device 1010 may acquire image data from the changed location information and transmit the image data and the changed location information to the external device 1020. The external device 1020 may change the display information of the virtual objects on the basis of the image data and the changed location information, generate a new virtual object, or remove some virtual objects. The external device 1020 may transmit display information of the changed, generated, or removed virtual objects to the AR device 1010. The AR device 1010 may change and display brightness of the virtual objects on the basis of the changed display information of the virtual objects received from the external device 1020.

Figure 11:
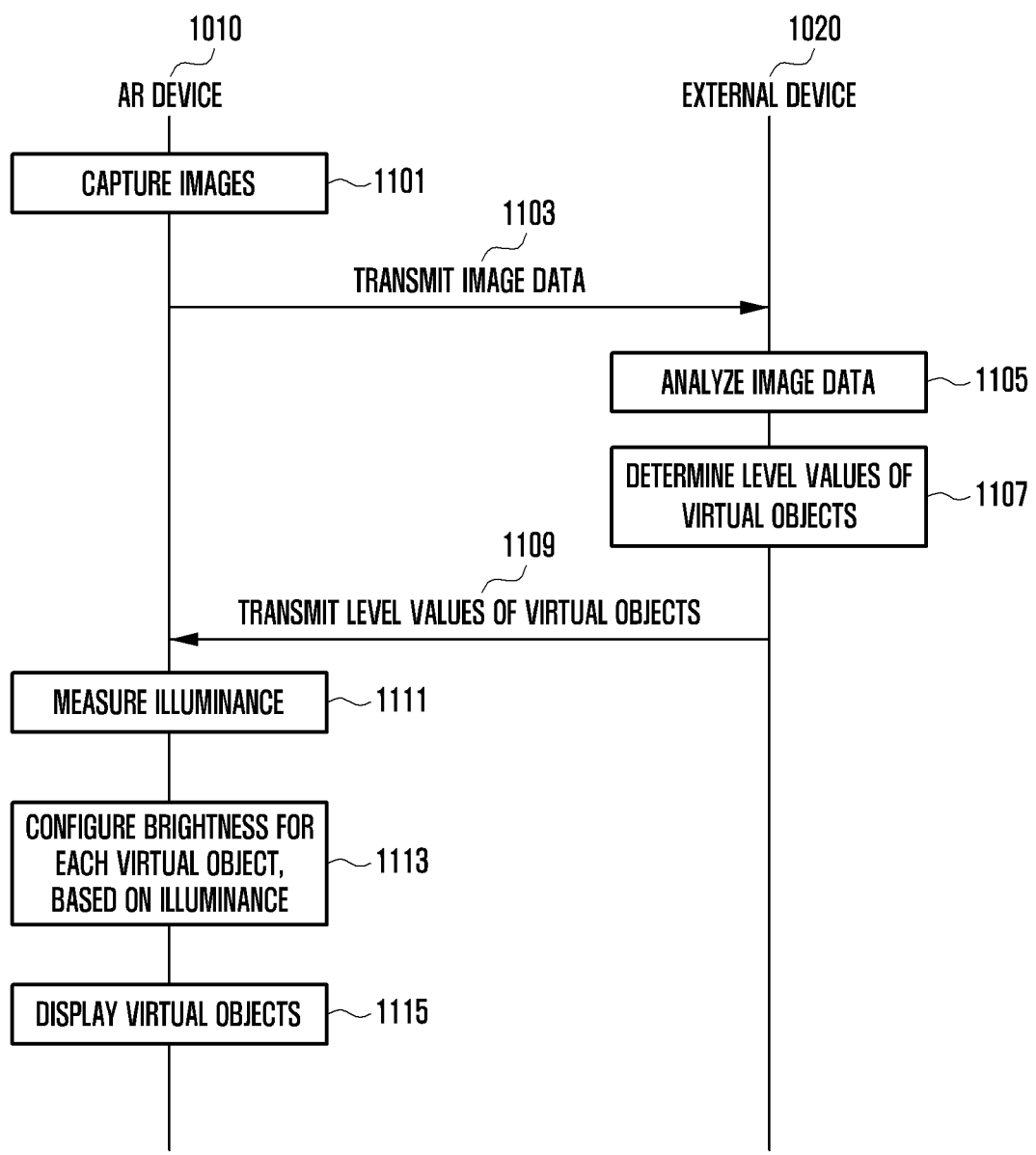
FIG. 11 is another flowchart illustrating the method of operating the AR device and the external device according to an embodiment of the disclosure.

FIG. 11 is another flowchart illustrating a method of operating the AR device and the external device according to an embodiment of the disclosure.

The AR device 1010 (for example, the electronic device 101 of FIG. 1) according to various embodiments may include a head-mounted display such as AR glasses.

Referring to FIG. 11, in operation 1101, the AR device 1010 may capture images through a camera module (for example, the camera module 180 of FIG. 1).

In operation 1103, the AR device 1010 may transmit image data to the external device 1020 (for example, the electronic device 102, the electronic device 104, or the server 108 of FIG. 1) through a communication module (for example, the communication module 190 of FIG. 1). The image data may include at least some of the images captured in operation 1101. According to an embodiment, for transmission, the AR device 1010 and the external device 1020 may be paired. For example, the AR device 1010 and the external device 1020 may be communication-connected through the first network 198 (for example, a short-range wireless communication network) or the second network 199 (for example, a long-range wireless communication network).

In operation 1105, the external device 1020 may analyze image data. The external device 1020 may analyze the image data received from the AR device 1010 through a communication module (for example, the communication module 190 of FIG. 1) and generate at least one virtual object included in the image data.

In operation 1107, the external device 1020 may determine level values of the virtual objects. The level values of the virtual objects may include relative brightness values according to locations of the virtual objects for displaying the virtual objects. For example, the locations of the virtual objects may be based on locations of real objects included in the image data.

In operation 1109, the external device 1020 may transmit the level values of the at least one virtual object.

In operation 1111, the AR device 1010 may measure illuminance. The AR device 1010 may measure illuminance through an illuminance sensor (for example, the sensor module 176 of FIG. 1 or the illuminance sensor 230 of FIG. 2) in real time, periodically, or selectively. Since operation 1111 is the same as or similar to operation 301 of FIG. 3, a detailed description thereof may be omitted.

In operation 1113, the AR device 1010 may configure brightness of each virtual object on the basis of the measured illuminance. The AR device 1010 may configure the brightness of each virtual object on the basis of the level values of the virtual objects and the illuminance. The AR device 1010 may reflect the relative brightness in the measured illuminance to configure the brightness of each virtual object.

In operation 1115, the AR device 1010 may display virtual objects. According to an embodiment, the AR device 1010 may display brightness of the virtual objects at the configured brightness. For example, the AR device 1010 may display one or more virtual objects having difference in at least some of the brightness configurations between virtual objects through a head-mounted display such as AR glasses.

A method of operating an electronic device (for example, the electronic device 101 of FIG. 1) according to various embodiments may include an operation of measuring illuminance through an illuminance sensor (for example, the illuminance sensor 230 of FIG. 2) of the electronic device, an operation of configuring brightness of a first virtual object, based on the measured illuminance, an operation of identifying a distance between the first virtual object and a second virtual object, an operation of configuring brightness of the second virtual object, based on the brightness of the first virtual object and the identified distance, and an operation of controlling displaying of the first virtual object and the second virtual object through a display module (for example, the display module 160 of FIG. 1) of the electronic device, based on the configured brightness.

The operation of identifying may include an operation of identifying depth information for displaying the first virtual object and the second virtual object on the display module.

A memory (for example, the memory 130 of FIG. 1) of the electronic device may include a brightness table in which brightness for each distance is configured, and the operation of configuring the brightness of the second virtual object may include an operation of configuring the brightness of the second virtual object on the basis of the brightness of the first virtual object, the identified distance, and the brightness table.

The operation of configuring the brightness of the first virtual object may include an operation of identifying an operation state of the electronic device and an operation of configuring the brightness of the first virtual object on the basis of the measured illuminance and the operation state.

The method may further include, when the first virtual object or the second virtual object is a virtual object based on a real world, an operation of recognizing a first real object and a second real object in the real world from a preview image acquired through a camera module of the electronic device and an operation of matching the first virtual object to correspond to the first real object and matching the second virtual object to correspond to the second real object.

The operation of identifying may include an operation of identifying location information including the first real object and the second real object and an operation of identifying a distance between the first virtual object matching the first real object and the second virtual object matching the second real object on the basis of the location information.

The method may further include an operation of determining whether the location information of the electronic device is changed while displaying of the first virtual object and the second virtual object is controlled, and operation of, when the location information of the electronic device is changed, identifying the location information of the electronic device and a distance between the first virtual object and the second virtual object, and an operation of controlling brightness of the first virtual object and brightness of the second virtual object on the basis of the changed distance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   an illuminance sensor;
   a camera;
   a display circuit;
   a memory; and
   a processor operatively connected to the illuminance sensor, the camera, the display circuit, and the memory,
   wherein the processor is configured to:
   measure illuminance through the illuminance sensor,
   identify an operation state of the electronic device, the operation state comprising at least one of a remaining battery of the electronic device, temperature of the electronic device, a mode configured in the electronic device, or information on applications being executed,
   configure brightness of a first virtual object, based on the measured illuminance,
   identify a distance between the first virtual object and a second virtual object, the distance being measured in any direction from the first virtual object to the second virtual object,
   configure brightness of the second virtual object, based on the brightness of the first virtual object and the identified distance, the brightness of the second object being reduced as the distance between the first virtual object and a second virtual object increases, and
   control displaying of the first virtual object and the second virtual object through the display circuit, based on the configured brightness.

2. The electronic device of claim 1, wherein the processor is further configured to:
   identify depth information to display the first virtual object and the second virtual object on the display circuit; and
   configure brightness of the second virtual object, based on the brightness of the first virtual object and the identified depth information.

3. The electronic device of claim 1,
   wherein the memory comprises a brightness table in which brightness for each distance is configured, and
   wherein the processor is further configured to configure brightness of the second virtual object, based on the brightness of the first virtual object, the identified distance, and the brightness table.

4. The electronic device of claim 1, wherein the processor is further configured to:
   configure brightness of the first virtual object, based on the measured illuminance and the operation state.

5. The electronic device of claim 4, wherein the processor is further configured to:
   configure a reference value for configuring object brightness, based on the operation state;
   not limit the configuration of brightness of the first virtual object in case that the reference value is high; and
   control the brightness of the first virtual object not to be larger than or equal to a brightness reference value in case that the reference value is low.

6. The electronic device of claim 1, wherein the first virtual object or the second virtual object comprises a virtual reality (VR) virtual object displayed in virtual reality or an AR virtual object displayed in augmented reality.

7. The electronic device of claim 1, wherein the processor is further configured to:
   in case that the first virtual object or the second virtual object is a virtual object based on a real world, identify a first real object and a second real object in the real world from a preview image acquired through the camera;
   match the first virtual object to correspond to the first real object and match the second virtual object to correspond to the second real object;
   acquire location information comprising the first real object and the second real object; and
   determine a distance between the first virtual object and the second virtual object, each of which matches according to a distance difference of the first real object and the second real object, based on the location information.

8. The electronic device of claim 1, wherein the processor is further configured to:

acquire location information of the electronic device; and control brightness of the first virtual object or brightness of the second virtual object, based on the location information.

9. The electronic device of claim 8, wherein the processor is further configured to:

determine whether location information of the electronic device is changed while displaying of the first virtual object and the second virtual object is controlled;

identify the location information of the electronic device and a distance between the first virtual object and the second virtual object in case that the location information of the electronic device is changed; and control the brightness of the first virtual object and the brightness of the second virtual object, based on the changed distance.

10. A system for displaying virtual objects, the system comprising:

an augmented reality (AR) device configured to:

acquire image data through a camera, measure illuminance through an illuminance sensor, identify an operation state of the AR device, the operation state comprising at least one of a remaining battery of the AR device, temperature of the AR device, a mode configured in the AR device, or information on applications being executed, transmit the image data and a measured illuminance value to an external device, and display virtual objects, based on display information of the virtual objects received from the external device; and the external device configured to:

receive the image data and the measured illuminance value from the AR device, analyze the image data, configure brightness of a first virtual object included in the image data, based on the measured illuminance, identify a distance between the first virtual object and a second virtual object, the distance being measured in any direction from the first virtual object to the second virtual object, configure brightness of the second virtual object, based on the brightness of the first virtual object and the identified distance, the brightness of the second object being reduced as the distance between the first virtual object and a second virtual object increases, and transmit display information of virtual objects including the brightness configured in the first virtual object and the second virtual object to the AR device.

11. The system of claim 10, wherein the AR device is further configured to identify location information through a communication circuit and transmit the identified location information to the external device, and wherein the external device is further configured to configure the brightness of the first virtual object, based on the location information of the AR device and the measured illuminance.

12. The system of claim 11, wherein, in case that the location information is changed, the AR device is further configured to transmit the changed location information to the external device, and wherein the external device is further configured to change the display information of the virtual objects, based on the changed location information and transmit the changed display information to the AR device.

13. The system of claim 11, wherein, in case that the location information is changed, the AR device is further configured to acquire image data from the changed location information and transmit the image data and the changed location information to the external device, and wherein the external device is further configured to change the display information of the virtual objects, based on the image data and the changed location information and transmit the changed display information to the AR device.

14. A method of operating an electronic device, the method comprising:

measuring illuminance through an illuminance sensor of the electronic device;

identifying an operation state of the electronic device, the operation state comprising at least one of a remaining battery of the electronic device, temperature of the electronic device, a mode configured in the electronic device, or information on applications being executed;

configuring brightness of a first virtual object, based on the measured illuminance;

identifying a distance between the first virtual object and a second virtual object, the distance being measured in any direction from the first virtual object to the second virtual object;

configuring brightness of the second virtual object, based on the brightness of the first virtual object and the identified distance, the brightness of the second object being reduced as the distance between the first virtual object and a second virtual object increases; and controlling displaying of the first virtual object and the second virtual object through a display circuit of the electronic device, based on the configured brightness.

* * * * *